(12) United States Patent
Jang et al.

(10) Patent No.: US 10,946,340 B2
(45) Date of Patent: Mar. 16, 2021

(54) SUPERHYDROPHOBIC COATED MICRO-POROUS CARBON FOAM MEMBRANE AND METHOD FOR SOLAR-THERMAL DRIVEN DESALINATION

(71) Applicant: UT-Battelle, LLC, Oak Ridge, TN (US)

(72) Inventors: Gyoung Gug Jang, Knoxville, TN (US); James William Klett, Knoxville, TN (US); Panos G. Datskos, Golden, CO (US); Joanna McFarlane, Oak Ridge, TN (US); Michael Hu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/583,593

(22) Filed: Sep. 26, 2019

(65) Prior Publication Data

US 2020/0101420 A1    Apr. 2, 2020

Related U.S. Application Data

(60) Provisional application No. 62/738,503, filed on Sep. 28, 2018.

(51) Int. Cl.
*B01D 61/36* (2006.01)
*B01D 71/02* (2006.01)
(Continued)

(52) U.S. Cl.
CPC .......... *B01D 61/364* (2013.01); *B01D 5/006* (2013.01); *B01D 5/0039* (2013.01);
(Continued)

(58) Field of Classification Search
CPC .... B01D 1/0035; B01D 5/0039; B01D 5/006; B01D 61/364; B01D 61/366; B01D 69/02;
(Continued)

(56) References Cited

U.S. PATENT DOCUMENTS

| 669,966 A | 3/1901 | Rose |
| 3,830,705 A | 8/1974 | Dewegeli |

(Continued)

FOREIGN PATENT DOCUMENTS

| CN | 103739029 B | 5/2015 |
| CN | 106365235 A | 2/2017 |

(Continued)

OTHER PUBLICATIONS

Wu, J. et al. (2017) Journal of Materials Chemistry A, 5, 23712-23719.*

(Continued)

*Primary Examiner* — Brian A McCaig
(74) *Attorney, Agent, or Firm* — Fox Rothschild LLP

(57) ABSTRACT

A solar membrane distillation apparatus includes a housing comprising a light transmitting wall. A solar distillation membrane is positioned in the housing to receive solar radiation transmitted through the light transmitting wall. The solar distillation membrane includes a porous graphitic foam and a coating of a hydrophobic composition on the surface and pores of the graphitic foam. A water chamber within the housing is provided for retaining water adjacent to the solar distillation membrane. A vapor chamber is provided for collecting water vapor distilling through the solar distillation membrane. A condenser is provided for condensing distilled water vapor from the vapor chamber into liquid water. A separation membrane and a method of solar distillation are also disclosed.

23 Claims, 19 Drawing Sheets

(51) Int. Cl.
*B01D 69/02* (2006.01)
*B01D 5/00* (2006.01)
*C02F 1/44* (2006.01)
*C02F 1/14* (2006.01)

(52) U.S. Cl.
CPC ........... *B01D 61/366* (2013.01); *B01D 69/02* (2013.01); *B01D 71/021* (2013.01); *C02F 1/14* (2013.01); *C02F 1/447* (2013.01); *B01D 2325/38* (2013.01)

(58) Field of Classification Search
CPC ..... B01D 71/021; B01D 2325/38; C02F 1/14; C02F 1/447
See application file for complete search history.

(56) References Cited

U.S. PATENT DOCUMENTS

| | | | |
|---|---|---|---|
| 4,069,812 | A | 1/1978 | O'Neill |
| 4,119,083 | A | 10/1978 | Heyen et al. |
| 4,420,375 | A | 12/1983 | Husson |
| 6,033,506 | A | 3/2000 | Klett |
| 6,037,032 | A | 3/2000 | Klett et al. |
| 6,261,485 | B1 | 7/2001 | Klett |
| 6,287,375 | B1 | 9/2001 | Klett |
| 6,344,159 | B1 | 2/2002 | Klett |
| 6,355,144 | B1 | 3/2002 | Weinstein |
| 6,387,343 | B1 | 5/2002 | Klett |
| 6,398,994 | B1 | 6/2002 | Klett |
| 6,399,149 | B1 | 6/2002 | Klett et al. |
| 6,491,891 | B1 | 12/2002 | Klett et al. |
| 6,656,443 | B2 | 12/2003 | Klett |
| 6,673,328 | B1 | 1/2004 | Klett et al. |
| 6,767,433 | B2 | 7/2004 | Foster et al. |
| 6,780,505 | B1 | 8/2004 | Klett et al. |
| 6,855,744 | B2 | 2/2005 | Klett et al. |
| 7,070,755 | B2 | 7/2006 | Klett et al. |
| 7,153,395 | B2 | 12/2006 | Foster et al. |
| 7,264,695 | B2 | 9/2007 | Foster et al. |
| 7,456,131 | B2 | 11/2008 | Klett et al. |
| 7,670,682 | B2 | 3/2010 | Klett et al. |
| 8,511,072 | B2 | 8/2013 | Judkins et al. |
| 8,790,754 | B1 | 7/2014 | Rangan et al. |
| 9,394,672 | B2 | 7/2016 | Judkins et al. |
| 2005/0048193 | A1 | 3/2005 | Li et al. |
| 2014/0263060 | A1 | 9/2014 | Summers et al. |
| 2015/0266750 | A1 | 9/2015 | Abdeen |
| 2016/0107121 | A1 | 4/2016 | Lienhard et al. |
| 2017/0129786 | A1* | 5/2017 | Chen ...................... B01J 20/262 |
| 2020/0101420 | A1 | 4/2020 | Jang et al. |

FOREIGN PATENT DOCUMENTS

| | | | |
|---|---|---|---|
| WO | 2017/002077 | A1 | 1/2017 |
| WO | 2019/053638 | A1 | 3/2019 |
| WO | 2019/190762 | A1 | 10/2019 |

OTHER PUBLICATIONS

Said, I.A. et al. (2019) Industrial and Engineering Chemistry Research, 58, 18829-18835.*
Takai, K. et al. (2020) Graphene: Preparations, Properties, Applications, and Prospects, Elsevier, 620 pgs [Office action cites p. 123].*
http://www.watersolutions.ch/ accessed Oct. 21, 2020.
https://www.maximwater.com/ accessed Oct. 21, 2020.
Gleick, P. H., Dirty-water: estimated deaths from water-related diseases 2000-2020. Citeseer: 2002.
"Leenaars et al, The Preparation of Alumina Membranes with Ultrafine Pores, J. Coll. Interface Sci., vol. 105, No. 1 May 1985, 27-40."
Leenaars et al, The Preparation and Characterization of Alumina Membranes with Ultra-fine Pores: Part 1 Microstructural investigations on non-supported membranes, J. Mat. Sci, 19 (1984) 1077-1088.
Klett et al.: "The role of structure on the thermal properties of graphitic foams", Journal of M Aterials Science 39 (2 004) 3659-3676.
Wu et al. (2017) Journal of Materials Chemistry A, 5, 23712-23719.
Said et al. (2019) Industrial and Engineering Chemistry Research, 58, 18829-18835.
Takai et al. (2020) Graphene: Preparations, Properties, Applications, and Prospects, Elsevier, 620 pgs. [Office action cites p. 123].
Y. Ito, Y. Tanabe, J. Han, T. Fujita, K. Tanigaki, M. Chen. "Multi-functional Porous Graphene for High-Efficiency Steam Generation by Heat Localization" Adv. Mater. 27 (2015) 4302-4307.
L. Zhou, Y. Tan, J. Wang, W. Xu, Y. Yuan, W. Cai, S. Zhu, J. Zhu "3D self-assembly of aluminum nanoparticles for plasmon-enhanced solar desalination" Nature Photonics 10 (2016) 393-398.
O. Neumann, A. S. Urban, J. Day, S. Lal, P. Nordlander, N. J. Halas "Solar Vapor Generation Enabled by Nanoparticles" ACS Nano 7 (2013) 42-29.
H. Ghasemi, G. Ni A. M. Marconnet, J. Loomis, S. Yerci, N. Miljkovic, G. Chen, "Solar steam generation by heat localization" Nature Communications 5 (2014) 4449 doi:10.1038/ncomms5449.
X. Li, W. Xu, M. Tang, L. Zhou, B. Zhu, S. Zhu, J. Zhu "Graphene oxide-based efficient and scalable solar desalination under one sun with a confined 2D water path" PNAS 113 (2016) 13953-13958.
L. Eykens, K.D. Sitter, C. Dotremont, L. Pinoy, B.V. d. Druggen, How to Optimize the Membrane Properties for Membrane Distillation: A Review. Ind. Eng. Chem. Res. 55 (2016) 9333-9343.
B.S. Lalia, V. Kochkodan, R. Hashaikeh, N. Hilal, A review on membrane fabrication: structure, properties and performance relationship, Desalination 326 (2013) 77.
U.K. Kesieme, N. Milne, H. Aral, C. Y. Cheng, M. Duke, Economic analysis of desalination technologies in the context of carbon pricing, and opportunities for membrane distillation, Desalination, 323 (2013) 66-74.
H. Sharon, K.S. Reddy, Renewable and Sustainable Energy Reviews 2015, 41, 1080.
K. Bae, G. Kang, S. K. Cho, W. Park, K. Kim, W. J. Padilla, Nature Communications 2015, 6,10103.
P. Zhang, J. Li, L. Lv, Y. Zhao, L. Qu, ACS Nano 2017, 11, 5087.
H. C. Duong, M. Duke, S. Gray, P. Cooper, L. D. Nghiem, Desalination 2016, 397, 92.
P. D. Dongare, A. Alabastri, S. Pedersen, K. R. Zodrow, N. J. Hogan, O. Neumann, J. Wu, T. Wang, A. Deshmukh, M. Elimelech, Q. Li, P. Nordlander, N. J. Halas, PNAS 2017, 114, 6936.
W. Fuqiang, C. Ziming, T. Jianyu, Y. Yuan, S. Yong, L. Linhua, Renewable and Sustainable Energy Reviews 2017, 79, 1314.
J. Klett, Carbon Foams, Cellular Ceramics, Wiley-VCH Verlag GmbH & Co. KGaA2006, pp. 137-157.
J. Klett, R. Hardy, E. Romine, C. Walls, T. Burchell, Carbon 2000, 38(7), 953.
https://solarspring.de/en/home-en/ accessed Dec. 21, 2020.
S. Wang, L. Jiang, Adv. Mater. 2007, 19, 3423.
C. Chen, Y. Li, J. Song, Z. Yang, Y. Kuang, E. Hitz, C. Jia, A. Gong, F. Jian, J. Y. Zhu, B. Yang, J. Xie, and L. Hu, Adv. Mater. 2017, 29, 1701756.
H. C. Duong, P. Cooper, B. Nelemans, T. Y. Cath, L. D. Nghiem, Separation and Purification Technology 2016, 166, 55.
Pugsley, A. Zacharopoulos, J. D. Mondol, M. Smyth, Renewable Energy 2016, 88, 200.
Jang et al.: "Efficient Solar-Thermal Distillation Desalination Device by Light Absorptive Carbon Composite Porous Foam", Global Challenges, 2019.
International Search Report dated Jul. 31, 2019 mailed in PCT/US2019/022233.
Guillén-Burrieza et al.: "Experimental analysis of an air gap membrane distillation solar desalination pilot system", Journal of Membrane Science 379 (2011) 386-396.
Walton, N. (1989). Electrical Conductivity and Total Dissolved Solids—what is Their Precise Relationship? Desalination, 72(3), pp. 275-292.

(56) References Cited

OTHER PUBLICATIONS

Fath et al.: "PV and thermally driven small-scale, stand-alone solar desalination systems with very low maintenance needs", Desalination 2008, 225, 58-69.
Chang et al.: "Optimization Study of Small-Scale Solar Membrane Distillation Desalination Systems (s-SMDDS)" Int. J. Environ. Res. Public Health 2014, 11, 12064-12087.
Rainmakertm 550http://www.solaqua.com/solstils1.html accessed Oct. 21, 2020.
Carocell 2000 http://www.fcubed.com.au/aspx/carocell-panels.aspx accessed Oct. 21, 2020.
WATERCONE® http://www.watercone.com/product.html accessed Oct. 21, 2020.
Tanvir et al.: "A Novel Solar Thermal Membrane Distillation System for Drinking Water Production in Underdeveloped Areas", 256th American Chemical Society National Meeting & Exposition, Sun, Aug. 19, 2018-Thu, Aug. 23, 2018.
Kumar et al.: "Co-Production Performance Evaluation of a NovelSolar Combi System for Simultaneous Pure Waterand Hot Water Supply in Urban Households of UAE". energies 2017, 10, 481.
Liu Z, et al."Extremely Cost-Effective and Efficient Solar Vapor Generation under Nonconcentrated Illumination Using Thermally Isolated Black Paper". Global Challenges 2017, 1, 1600003.
Echomax, https://www.echomax.co.uk/solar-stills accessed Oct. 21, 2020.
Kascade Solar Water; http://kascade.nl/solar-water/ accessed Oct. 21, 2020.
http://www.gabrielediamanti.com/projects/eliodomestico; accessed Oct. 21, 2020.
Do-Right Solar http://do-right-solar.com/sws200.php accessed Oct. 21, 2020.
https://www.f6s.com/waterfx, accessed Oct. 21, 2020.
https://watly.co/ accessed Oct. 21, 2020.
https://www.saltworkstech.com/ accessed Oct. 21, 2020.
http://www.memsys.eu/ accessed Oct. 21, 2020.
http://www.itn-nanovation.com/ accessed Oct. 21, 2020.
https://www.micronictechnologies.com/, accessed Oct. 21, 2020.

\* cited by examiner

SUPERHYDROPHOBIC COATED MICRO-POROUS CARBON FOAM MEMBRANE AND METHOD FOR SOLAR-THERMAL DRIVEN DESALINATION

CROSS-REFERENCE TO RELATED APPLICATIONS

This application claims priority to U.S. Provisional Application No. 62/738,503 filed on Sep. 28, 2018, entitled "Solar-thermal Driven Desalination Superhydrophobic Coated Micro-porous Carbon Foam Tubular Membrane", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to separation membranes, and more particularly to separation membranes that can be used for desalination processes

BACKGROUND OF THE INVENTION

The global scarcity of freshwater resources drives intensive research attention to solar desalination which can provide clean water directly from sunlight with minimum environmental impact. Many studies have explored high-efficiency solar desalination devices, and practical challenges are posed by complicated fabrication requirements, high cost, and scalability. In the direct approach such as solar stills and chimneys, a solar collector is coupled with a distillation mechanism and the process is carried out in one simple cycle. Large-scale deployment of such devices is limited by cost and losses in system efficiency associated with heat and mass transfer during evaporation and condensation.

Water evaporation using porous carbon nanomaterials is a promising technique for producing fresh water from salt water or other wastewater using abundant solar energy with high efficiency. With rapid development of nanotechnologies in recent years, two key elements for efficient solar driven desalination have been defined: 1) broadband solar absorption using nanomaterials, such as plasmonic nanoparticles, graphite and graphene, and 2) localized heat management using nano-structures such as porous nano-capillary channels for efficient vapor generation with minimized parasitic heat energy loss to bulk liquid. Compared with traditional solar desalination, these nano-structures can double the light-to-heat conversion efficiency resulting in an increase of the pure water production from 0.5 to 1.0 kg/m$^2 \cdot$h under 1 sun illumination (1 kWm$^{-2}$). It has been reported that graphite-carbon foam and porous N-doped graphene with 0.426 and 53 Wm$^{-1}$K$^{-1}$ of thermal conductivity have produced 66% and 80% of energy conversion, respectively.

Further fundamental understanding of solar thermal conversion and heat transfer in these nano-structured materials and a solution of practical processibility such as module design and fabrication cost are required to impact existing desalination issues. These solar evaporation systems have not been as effective as energy intensive distillation and membrane distillation systems which can produce 30-40 kg/m$^2 \cdot$h of sea water desalination. They have technical limitations in terms of the permeate flux, resulting from intrinsic material structure and properties such as hydrophilic nano-capillary channels for heat localization. Features of these nanostructures such as floating and wettable surfaces do not allow effective additional driving forces such as the use of vacuum or sweeping airflow. Therefore, nanostructured solar evaporation systems such as floating substrates are limited to use as small-scale portable devices.

Membrane distillation is a thermally driven separation process using hydrophobic microporous polymer membranes. The hydrophobicity of the membrane helps trap the liquid feed on the upstream side, while the microporous structure allows water vapor permeation through the membrane. Energy requirements are high for currently used membrane distillation desalination processes, but use of waste heat and renewable energy could enable large cost savings. A solar desalination panel with direct-contact membrane distillation and nanophotonics has been developed to allow the thermal management system to be scaled to allow higher operating temperatures and water flow rates. However, this approach is limited in a planar membrane module system by low photothermal conversion efficiency due to the polymer membrane, in which small pores, porosity, and thickness dominate the permeation vapor flux.

SUMMARY OF THE INVENTION

A solar membrane distillation apparatus includes a housing comprising a light transmitting wall. A solar distillation membrane can be positioned in the housing to receive solar radiation transmitted through the light transmitting wall. The solar distillation membrane can include a porous graphitic foam and a coating of a hydrophobic composition on the surface and pores of the graphitic foam. A water chamber can be provided within the housing for retaining water adjacent to the solar distillation membrane. A vapor chamber can be provided for collecting water vapor distilling through the solar distillation membrane. A condenser can be provided for condensing distilled water vapor from the vapor chamber into liquid water.

The membrane surface of the solar membrane distillation apparatus can be superhydrophobic. The solar distillation membrane can be tubular and with an open interior. The open interior of the tubular distillation membrane can form the water chamber. The solar distillation membrane can be in the form of a vessel, the vessel forming a liquid chamber. The condenser can include a feed water heat exchange conduit for receiving feed water and exchanging heat with the water vapor to condense the water vapor to liquid water.

The solar membrane distillation apparatus can include a pre-heating chamber for pre-heating feed water prior contacting the feed water with the distillation membrane. The pre-heating chamber can include a conduit with an outer layer of graphitic foam.

The solar distillation membrane can include micro/nano particles adhered within the pores of the graphitic foam. The micro/nano particles can include at least one selected from the group consisting of graphite and ceramic oxide. The micro/nano particles can be from 0.5 μm to 2 μm in diameter.

The pore size of the solar distillation membrane at the surface of the solar distillation membrane can be from 0.5 μm to 2 μm. The bulk porosity of the graphitic foam can be from 50 to 95%. The porosity of the pores of the graphitic foam at the surface of the distillation membrane can be from 40 to 80%.

The hydrophobic composition can be at least one selected from the group consisting of fluorosilanes, methyl-silanes, linear alkyl-silanes, branched alkyl-silanes, aromatic-silanes, fluorinated alkyl-silanes, dialkyl-silanes, carbon nanotubes, and carbon soot. The fluorosilane can include the reaction product of heptadecafluoro-1,1,2,2-tetrahydrodecyl) trichlorosilane. The hydrophobic coating can be from 1 to 2 nm thick.

A separation membrane according to the invention can include a graphitic foam and a surface coating of a hydrophobic composition on the surface and pores of the graphitic foam. The surface of the graphitic foam can be superhydrophobic. The micro/nano particles can be adhered within the pores of the graphitic foam. The micro/nano particles can include at least one selected from the group consisting of graphite and ceramic oxide. The micro/nano particles can be from 0.5 μm to 2 μm in diameter. The pore size of the separation membrane at the surface of the separation membrane can be from 0.5 μm to 2 μm.

A method of solar distillation can include the step of providing a solar distillation membrane positioned to receive solar radiation. The solar distillation membrane can include a porous graphitic foam and a surface coating of a hydrophobic composition on the surface and pores of the graphitic foam. The solar distillation membrane is contacted with solar or other radiation. Feed water is supplied to the solar distillation membrane. Water at the surface of the solar distillation membrane will be vaporized and the water vapor will pass through pores of the graphitic foam. Liquid water will be repelled by the hydrophobic surface of the solar distillation membrane. The water vapor is collected and the water vapor is condensed into liquid water.

The method can include the step of supplying feed water to a condenser prior to the solar distillation membrane, and exchanging heat with the collected water vapor distilled through the solar distillation membrane, whereby the water vapor will be condensed and the feed water will be heated. The method can include the step of pre-heating the feed water prior to contacting the feed water with the solar distillation membrane.

The solar distillation membrane can be provided at one location and the condensing step can be performed at another location defining a vapor space. The method can further include the step of withdrawing air from the vapor space between the solar distillation membrane and the condensing location prior to starting condensing of the water vapor. The withdrawing of air can be by vacuum. The withdrawing of air can be by water vapor pressure. In one embodiment the condensing step is not started until the withdrawing of air step has been completed, and water vapor from the solar distillation membrane forces air from the vapor space.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
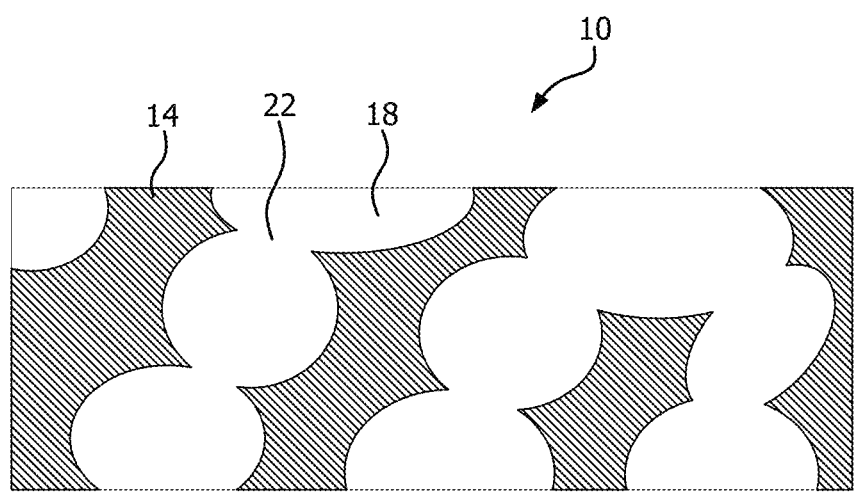
FIG. 1 is a schematic cross-sectional diagram of a graphitic foam.

A membrane distillation apparatus according to the invention includes a solar distillation membrane that is comprised of a porous graphitic foam. The graphitic foam has a coating of a hydrophobic composition on the surface and pores of the graphitic foam. A housing comprising a light transmitting wall can be provided, and the solar distillation membrane positioned in the housing to receive solar radiation transmitted through the light transmitting wall. The housing can be constructed in varying shapes, sizes and designs. A water chamber can be provided within the housing for retaining water adjacent to the solar distillation membrane. A vapor chamber can be provided for collecting water vapor distilling through the solar distillation membrane. A condenser can be provided for condensing distilled water vapor from the vapor chamber into liquid water. The distillation membrane can be used for different kinds of distillation processes. In one embodiment, the distillation membrane can be used for solar distillation.

The hydrophobic composition can be applied to the graphitic foam by any suitable means. In one embodiment, the hydrophobic composition can be applied by immersing the graphitic foam in a precursor composition which can include a solvent for the precursor composition. The precursor composition will cover surfaces and pores of the graphitic foam, such that when the hydrophobic composition is formed from the precursor composition the hydrophobic composition will cover the surface and the pores of the graphitic foam. The application of the hydrophobic composition can combine with the nanotexture of the graphitic foam to render the surface of the graphitic foam superhydrophobic.

The distillation membrane can be planar but can also take various shapes and sizes. For example, in one embodiment the distillation membrane can be in the shape of a vessel for forming the water chamber and containing the feed liquid, and also for distilling that liquid through the walls of the distillation vessel that comprise the distillation membrane. The vessel can be open or closed. The distillation membrane can be tubular with an open interior, the open interior of the tubular distillation membrane forming the water chamber and water vapor distilling through the distillation membrane forming the tube.

The condenser can be of any suitable construction. The condenser can be active as by heat exchange with a pumped liquid, or passive as by a condensing coil. In one embodiment, the condenser comprises a feed water heat exchange conduit, which receives feed water from a source and exchanges heat with the water vapor to condense the water vapor to liquid water. This heat exchange also serves to pre-heat the feed water, which assists in evaporating the feed water into water vapor at the distillation membrane.

A pre-heating chamber can also be provided for pre-heating the feed water prior contacting the feed water with the distillation membrane. The pre-heating chamber can be in the form of a solar water heater. Several constructions are known and can be used. Also, the pre-heater can be a metal pipe which is blackened on the outside to facilitate solar absorption. The pipe can be covered by a graphitic foam. The graphitic foam is black and also conducts heat extremely well. The pre-heating chamber can be hermetically isolated from the vapor chamber by a vapor/air impermeable and thermally insulated wall.

Nano/micro particles can be secured within the pores of the graphitic foam. The nano/micro particles can be adhered within the pores of the graphitic foam by a suitable resin or other method. The nano/micro particles can be carbon based or ceramic. The nano/micro particles can be graphite and/or ceramic oxide or other materials. It is possible to use one material for nano particles and in the same membrane use another material for micro particles, and to apply both to the surface of the graphitic foam to further limit the pore size at the surface and increase the surface texture to increase superhydrophobicity.

The nano/micro particles can be from 0.5 µm to 2 µm in diameter. The nano/micro particles can be 0.5, 0.6, 0.6, 0.7, 0.8, 0.9, 1.0, 1.1, 1.2, 1.3, 1.4, 1.5, 1.6, 1.7, 1.8, 1.9, and 2.0 µm in diameter, and can be within a range of any high and low value selected from these values. The nano/micro particles can comprise both nano particles and micro particles, and if so the size of such particles can be selected from any high value and low value selected from these values, with the nano particle range having a lower low value than the low value of the micro particle range, and a high value less than the high value of the micro particle range. The nano/micro particles should have a diameter less than the pore size of the graphitic foam.

The concentration of particles in resin solution can be controlled. For example, the particle concentration could be ~30 wt % of particle in liquid (resin+dilution agent, ethanol) for the first coating. To control the pore size, smaller particles can then be used with 2~10 wt % of particle solution. The graphite foam has 100 um~5 mm cell size and 5 um~1 mm of pore sizes. The pore size refers to the opening window between the cells, and the cell is a roundish chamber formed by the expanding gasses. The nano-particles should be smaller than the pore and the cell size, and are in the nano-level in size, where the pore and the cells of the graphitic foam are usually about 100 micron to 500 micron in size. The slurry of these nano particles should be viscous enough to not penetrate more than one or two cells through the pores (windows) as it is coated on the surfaced, but thin enough to fill the cell completely.

The pore size of the solar distillation membrane at the surface of the solar distillation membrane is from 0.5 µm to 2 µm. The pores can be 0.5, 0.6, 0.6, 0.7, 0.8, 0.9, 1.0, 1.1, 1.2, 1.3, 1.4, 1.5, 1.6, 1.7, 1.8, 1.9, and 2.0 µm in diameter, and can be within a range of any high and low value selected from these values. In the graphitic foam, the pore size is that of the window between the cells. At the surface of the membrane, the pore size is the gap between the particles that have been applied to the surface.

The bulk porosity of the graphitic foam can be from 50% to 95%. The bulk porosity of the graphitic foam can be 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94 and 95%, or within a range of any high value and low value selected from these values. The porosity of the pores of the graphitic foam at the surface of the distillation membrane is in part controlled by the size and relative proportion of nano and micro particles. The porosity of the pores at the surface of the membrane can be from 40 to 80%. The porosity of the pores at the surface of the membrane can be 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, and 80%, or within a range of any high value and low value selected from these values.

The hydrophobic composition that is used to coat the graphitic foam and the nano/micro particles can vary. Fluorosilanes, methyl-silanes, linear alkyl-silanes, branched alkyl-silanes, aromatic-silanes, fluorinated alkyl-silanes, dialkyl-silanes, carbon nanotubes, and carbon soot and mixtures thereof can be used to coat the nano/micro particles and render the surface hydrophobic and superhydrophobic. The fluorosilane can include the reaction product of heptadecafluoro-1,1,2,2-tetrahydrodecyl) trichlorosilane. The thickness of the hydrophobic coating can vary. The hydrophobic coating can in one embodiment be from 1 to 2 nm thick.

Figure 2:
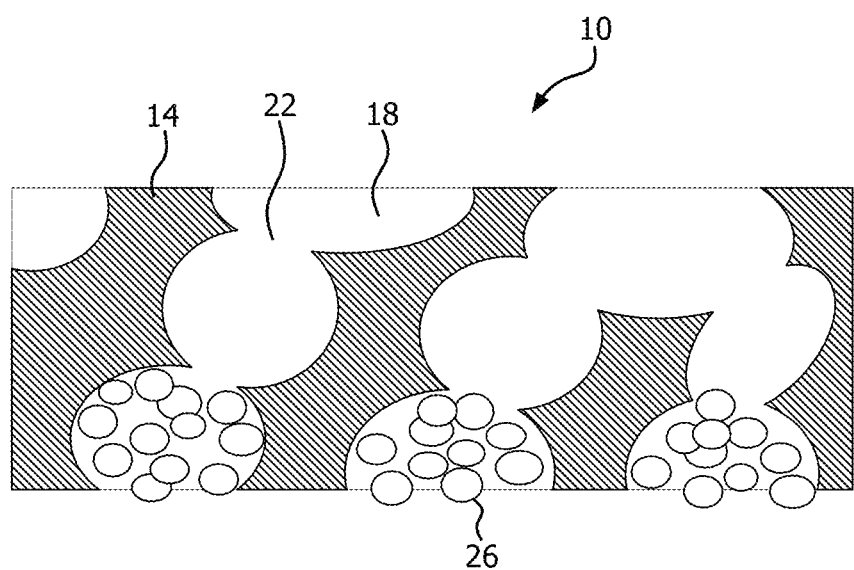
FIG. 2 is a schematic cross-sectional diagram of a graphitic foam having micro-particles deposited in pores.
Figure 3:
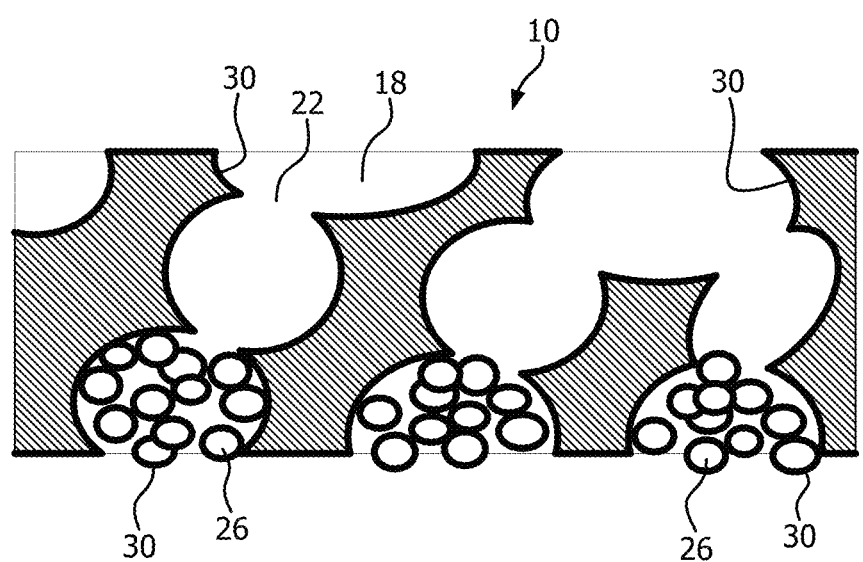
FIG. 3 is a schematic cross-sectional diagram of a graphitic foam having micro-particles deposited in pores, and coated with a hydrophobic composition.
Figure 4:
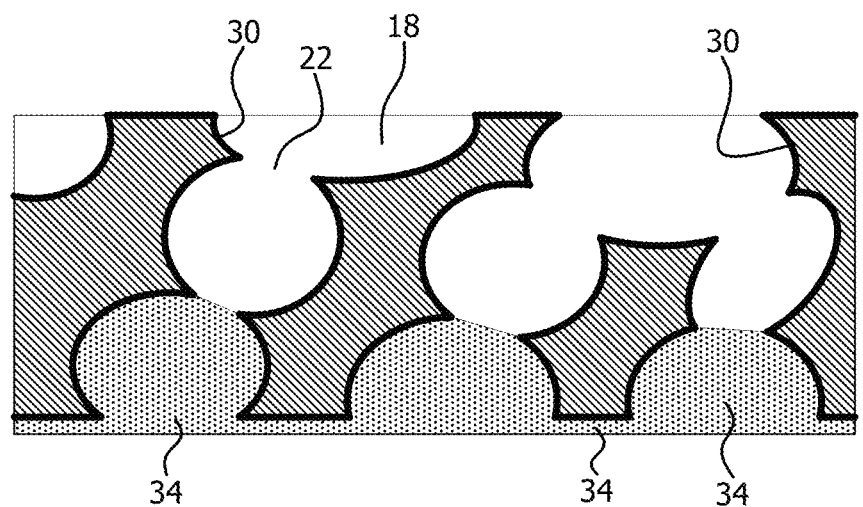
FIG. 4 is a schematic cross-sectional diagram of a graphitic foam having nanoparticles deposited in pores, and coated with a hydrophobic composition.
Figure 5:
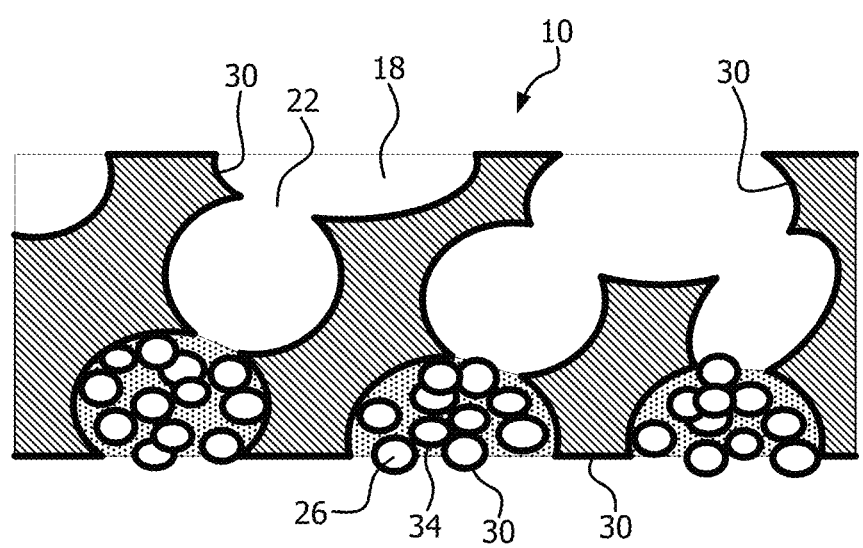
FIG. 5 is a schematic cross-sectional diagram of a graphitic foam having micro and nanoparticles in pores, and coated with a hydrophobic composition.

There is shown in FIG. 1 a schematic diagram of a graphitic foam 10. The graphitic foam includes a porous body 14 of the graphitic material which has cells 18 connected by pores 22. A surface layer of the cells 18 are filled with micro/nano particles, such as the micro particles 26, as shown in FIG. 2. A layer of hydrophobic material 30 (FIG. 3) is then applied by a suitable process, such as for example dip coating. Other application processes are possible. The application of the hydrophobic coating 30 renders the surface super hydrophobic. It is also possible to fill the surface cells 18 with nanoparticles 34 and the hydrophobic coating 30, as shown in FIG. 4. It is further possible to fill the surface cells 18 with a combination of microparticles 26 and nanoparticles 34, together with the hydrophobic coating material 30, as shown in FIG. 5.

Figure 6:
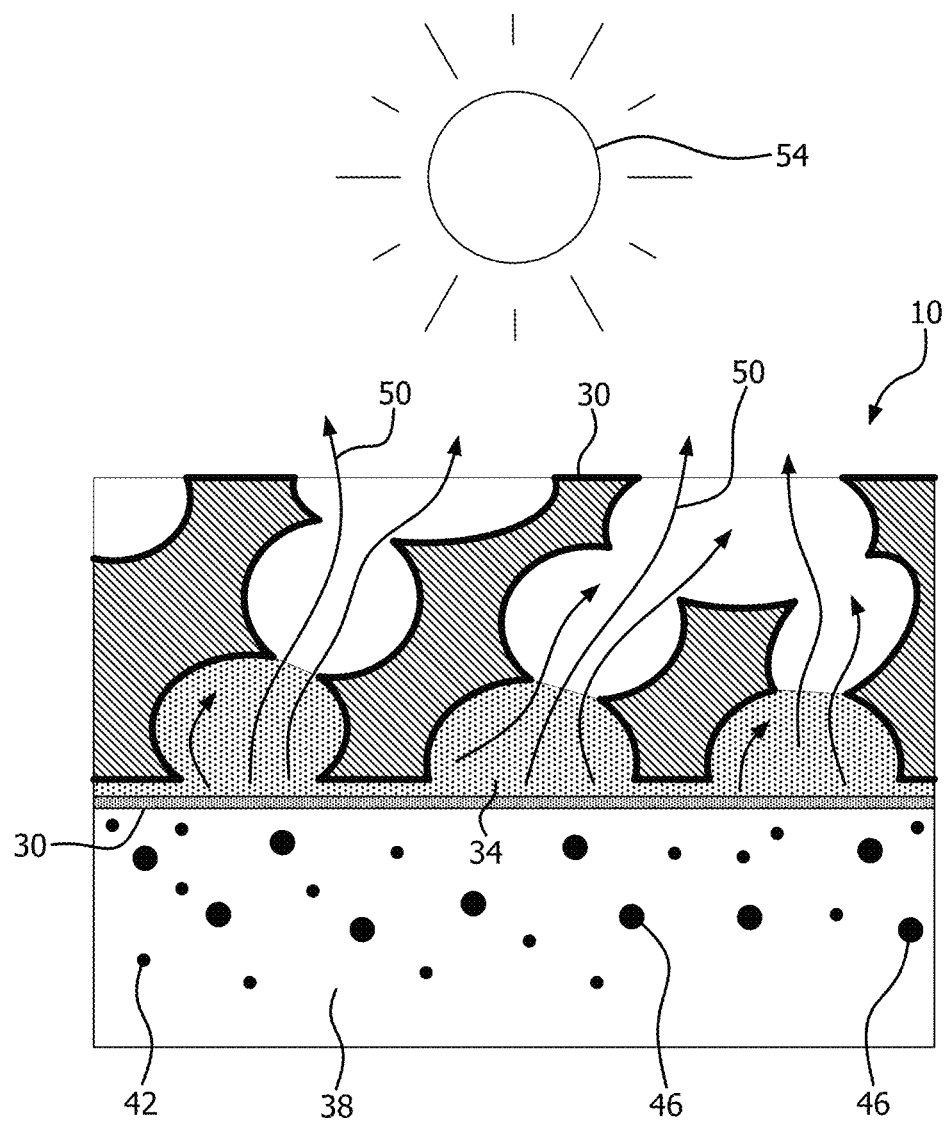
FIG. 6 is a schematic cross-sectional diagram of a solar distillation membrane and a solar distillation process.

There is shown in FIG. 6 a schematic depiction of the membrane 10 in operation. The membrane 10 with nanoparticles 34 positioned in surface cells thereof with the hydrophobic coating 30 rendering the surface of the membrane 10 adjacent feed water 38 to be super hydrophobic. The water 38 can for example include salt particles 42 and contaminants 46. Solar energy is received from Sun 54 or another radiation source. This energy strikes the membrane 10 and owing to the high thermal conductivity of the graphitic foam heat is transported to the surface of the membrane 10 adjacent water 38. Water 38 that is immediately adjacent the membrane 10 will the heated into vapor 50 which will pass through cells 18 including surface cells 18 with nanoparticles 34, and exit the opposite side of the membrane 10. Liquid water 38 will be repelled by the superhydrophobicity of the membrane 10 surface and will not wet or otherwise clog the cells 18 at the surface of the membrane 10.

Figure 7:
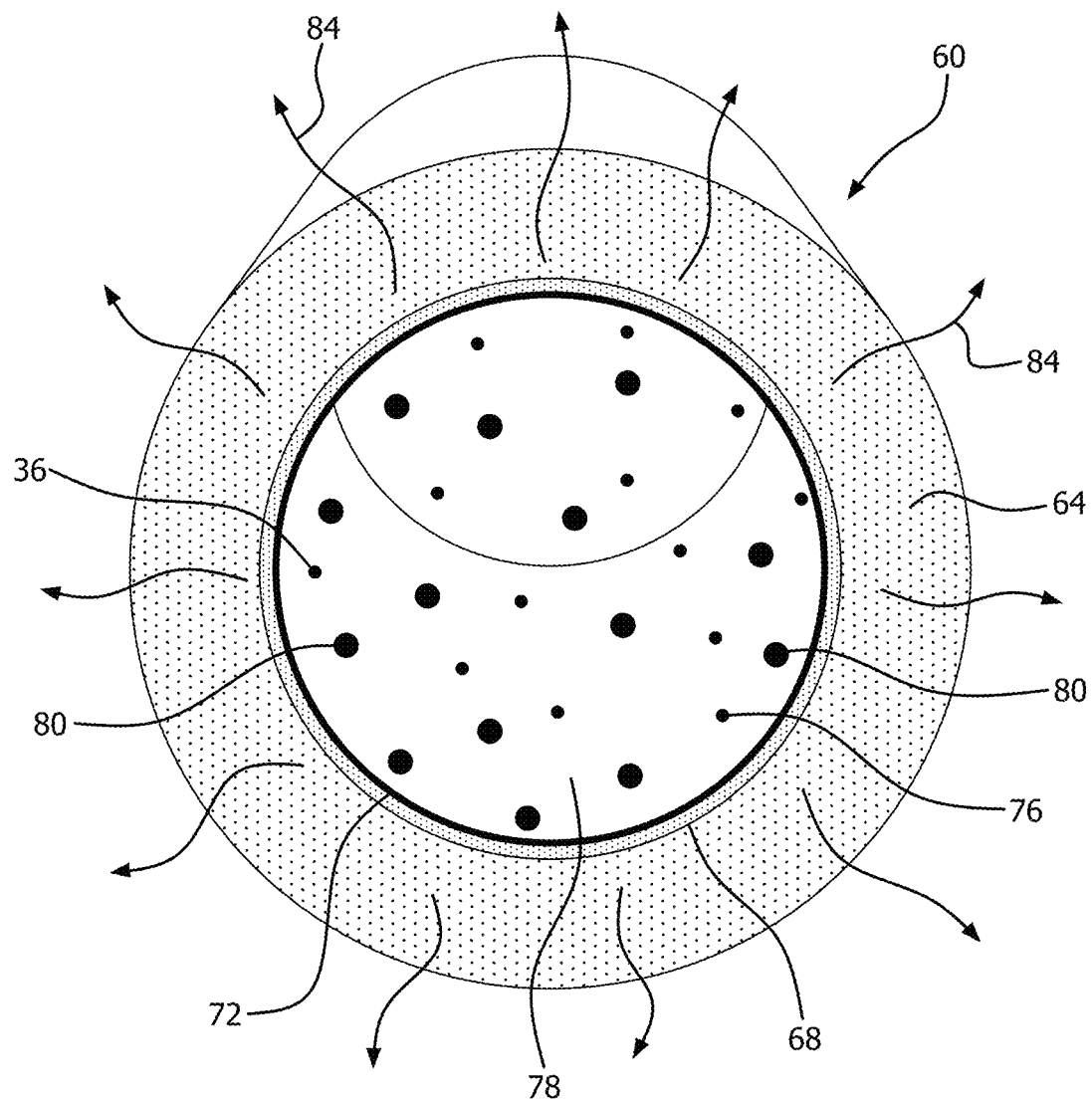
FIG. 7 is a schematic cross-sectional diagram of a tubular solar distillation membrane and a solar distillation process.

There is shown in FIG. 7 an alternative embodiment of the membrane of the invention in the form of a tubular membrane 60. The tubular membrane 60 includes a tubular-shaped graphitic foam 64 defining an open interior. The interior surface portion of the tubular graphitic foam 64 can be coated with micro/nano particles 68, followed by a coating of a hydrophobic material 72 to render the interior surface of the tubular membrane 60 super hydrophobic. Feed water 78 is supplied to the interior of the tubular membrane 60. The tubular membrane 60 can receive solar energy or other radiation to heat the tubular graphitic foam 64. The thermal conductivity of the graphitic foam tube 64 will transfer heat to water 78 at the interior surface. The water 78 will be transformed into vapor 84 which will pass through the pores of the graphitic foam 64. Salt particles 76 and/or contaminants 80 will be retained within the interior of the tubular membrane 60 and can be ejected at an exhaust end of the tubular membrane 60.

Figure 8:
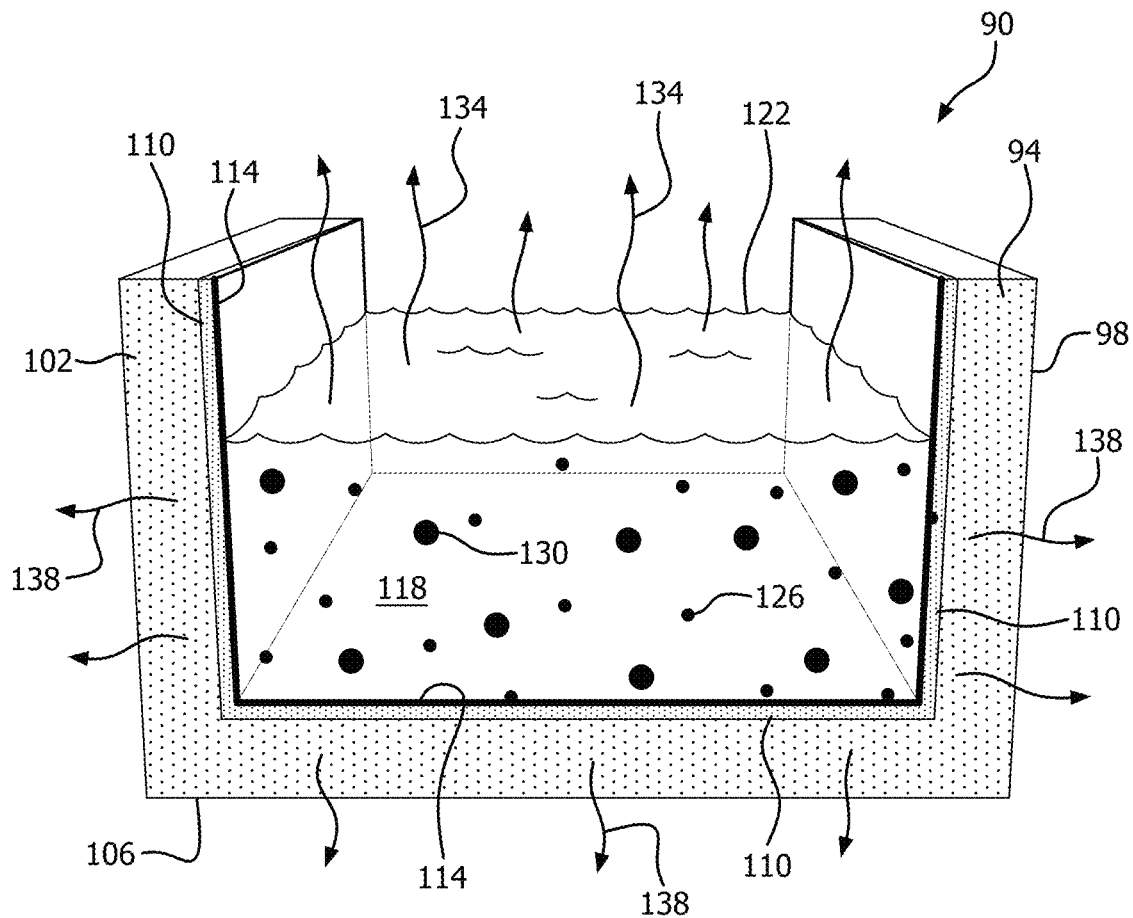
FIG. 8 is a schematic cross-sectional diagram of an open vessel solar distillation device, and solar distillation process.

There is shown in FIG. 8 an open vessel embodiment 90 having a graphitic foam container 94 with sidewalls 98 and 102, and base 106. The vessel 90 that is shown is substantially C-shaped in cross-section, however other designs are possible. The interior surface of the graphitic foam 94 has applied thereto micro/nano particles 110. A coating of hydrophobic material 114 renders the surface superhydrophobic. The vessel 90 can be elongated in the form of a trough through which feed water flows, or can be a fully enclosed container of varying possible dimensions. Feed water 118 is provided within the vessel 90 and is directly heated by solar radiation or other radiation. The solar radiation also strikes the graphitic foam 94 and heat is transferred by the graphitic foam 94 to the water 118. The heated water is vaporized to water vapor 138 which escapes through the cells and pores of the graphitic foam 94, and also vapor 134 which is created at the surface 122 of the water 118 and can be removed through suitable vapor exit conduit structure and condensed. Salt particles 126 and contaminants 130 are retained in the vessel 90 and can flow out of the vessel 90 or the concentrated water effluent can be removed from the vessel 90.

Figure 9:
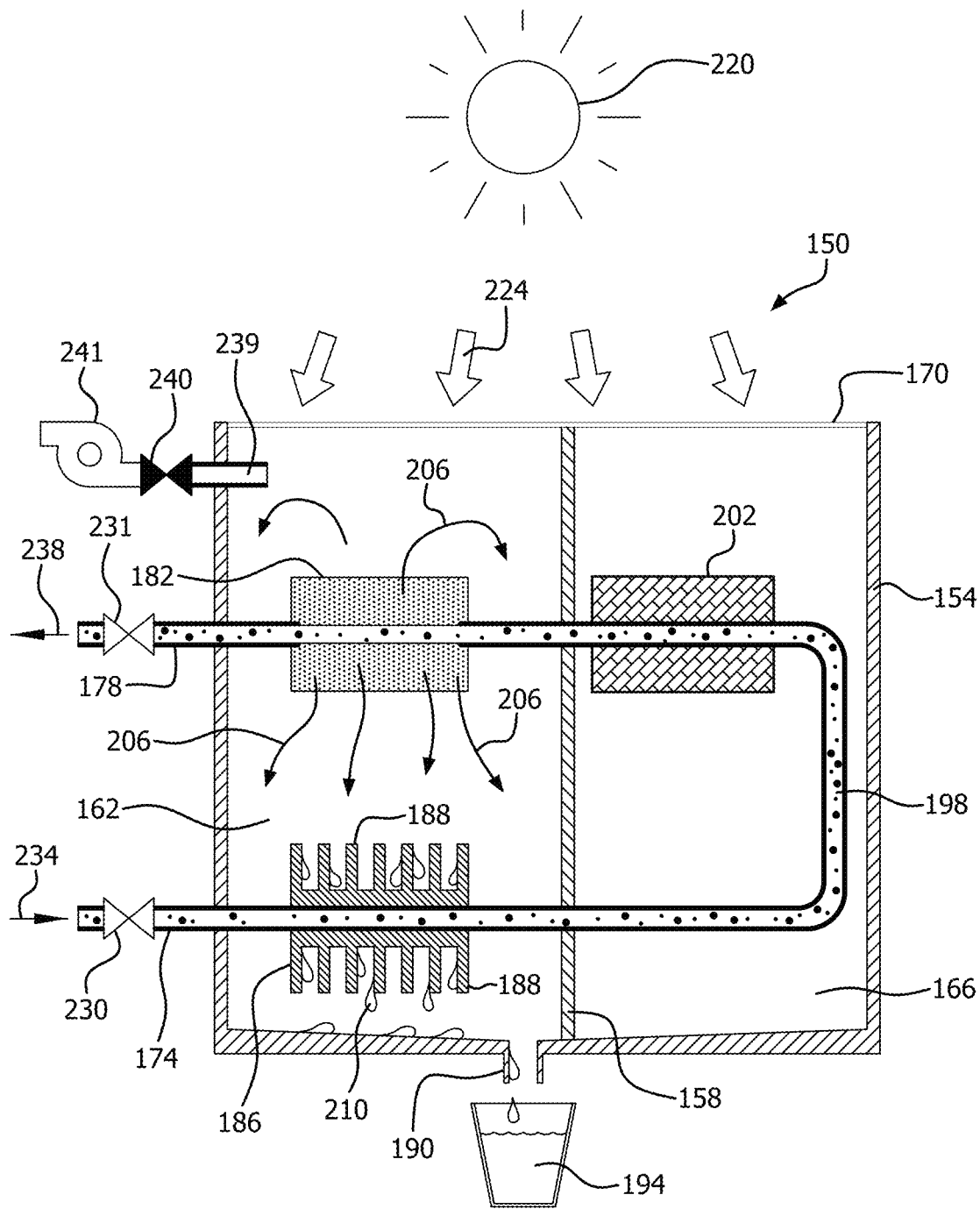
FIG. 9 is a schematic cross-sectional diagram illustrating a solar distillation apparatus and method.

The membrane of the invention can be used alone or in a variety of structures. One such structure is shown in FIG. 9, in the form of solar distillation apparatus 150. The solar distillation apparatus 150 has a housing 154 and a solar transmissive top 170 defining an open interior. The open interior can be subdivided as by thermally insulating wall 158 into a distillation chamber 162 and a preheating chamber 166. The thermal insulating wall 158 can be impenetrable to vapor and air. A feed water inlet 174 receives feed water and treated water is exhausted through treated water exhaust 178.

The membrane 182 of the solar distillation apparatus 150 in this embodiment is tubular. A suitable condenser 186 can be provided, and can have suitable condenser structure such as cooling fins 188. A preheater 202 can be provided to preheat water prior to the distillation membrane 182. The preheater 202 can operate by solar radiation, waste heat, or other suitable energy sources. The preheater 202 can be provided in the preheating chamber 166. Other constructions are possible. The preheater 202 can be a thermally conductive conduit with a solar absorptive coating such as the graphitic foam outer layer that is shown. Metal conduit with the outside painted black, or other preheating sources, is possible. Condensate 210 escapes through condensate collection opening 190 into a suitable container 194 or other apparatus.

The arrangement shown in FIG. 9 provides an efficient use of energy and space. Water enters at the feed water inlet 174 and passes through the condenser 186, where it is heated by the condensing water vapor. The water then travels from the distillation chamber 162 into the preheating chamber 166 through a connecting conduit 198. The water there enters the preheater 202. Solar radiation 224 passes the transmissive top 170 and heats the graphitic foam outer layer of the preheater 202. Water passing through the preheater is heated to facilitate vaporization at the distillation membrane 182. Solar radiation 224 from sun 220 or other radiation source strikes the graphitic foam of the distillation membrane 182. Heat is transferred from the graphitic foam to feed water flowing through the open interior of the tubular graphitic foam distillation membrane 182. Water vapor 206 passes through the pores of the distillation membrane 182 and contaminants and salt particles remain and exit with remaining water through treated water exhaust 178. The water vapor 206 will condense on fins 188 of the condenser 186, and the droplets 210 will exit through condensate collection opening 190 into container 194 or other condensate collection conduit. Feed water flow 234 into the feed water inlet 174 can be controlled by operation of a suitable valve 230. The flow of a liquid exhaust stream 238 can be controlled by operation of a suitable valve 231. A gas exhaust 239 can be provided and controlled by a valve 240 and/or pump 241 to control the atmosphere within the distillation chamber 162. The application of a vacuum or a positive pressure flow over the distillation membrane 182 can assist with vaporization of the feed water at the distillation membrane 182.

Operation of the distillation apparatus 150 will be more efficient if air 201 (FIG. 10) in the distillation chamber 162 is evacuated prior to operation. The air will otherwise absorb solar radiation, preventing it from reaching the distillation membrane, and will also interfere with the production and migration of water vapor from the membrane 182 to the condenser 186. The presence of air 201 in the preheating chamber 166 will not markedly affect the performance of the preheater 202. The vacuum pump 241 can be utilized to exhaust air 201 from the distillation chamber 162 prior to operation.

Figure 10:
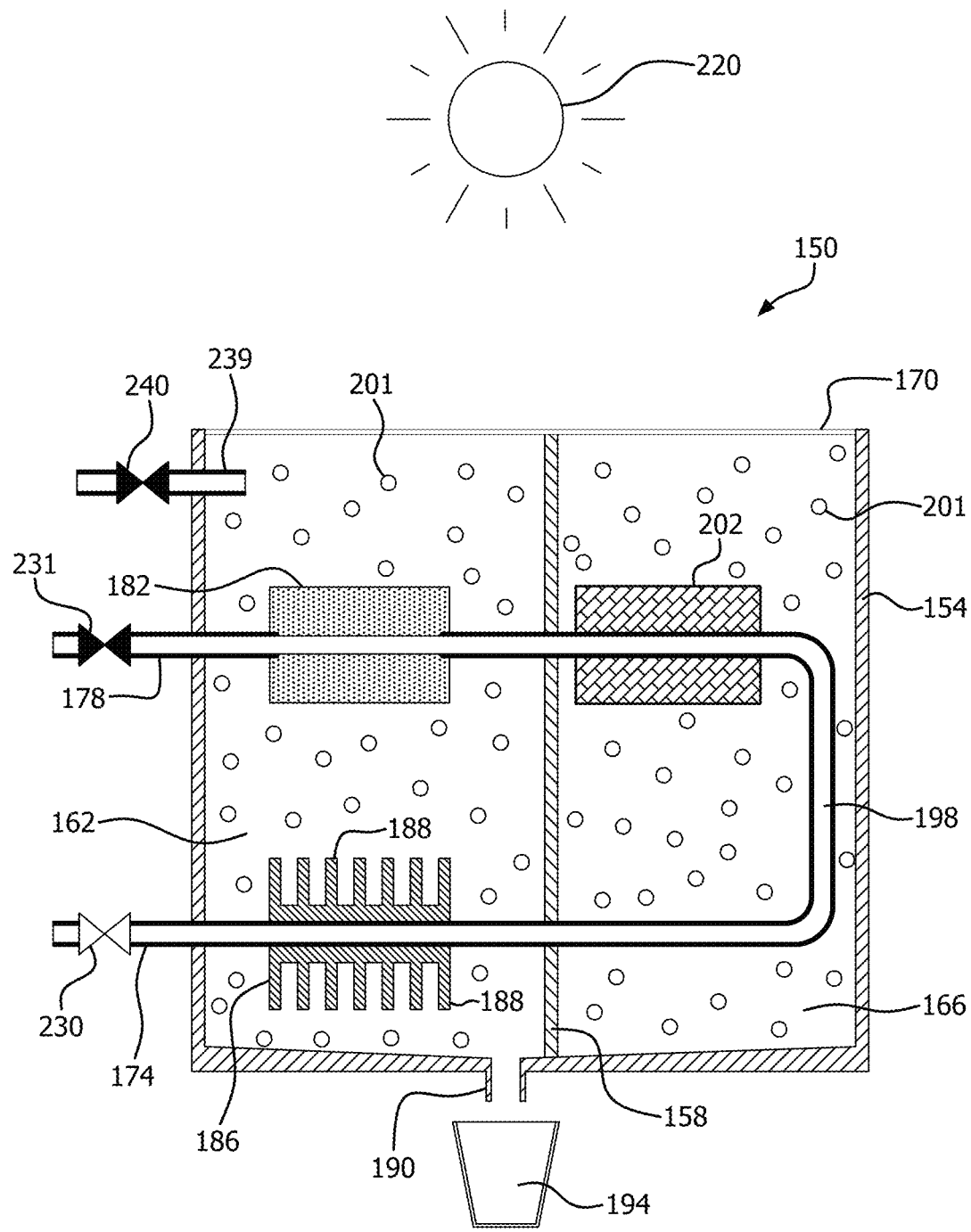
FIG. 10 is a schematic cross-sectional diagram illustrating a solar distillation apparatus in a first mode of operation.
Figure 11:
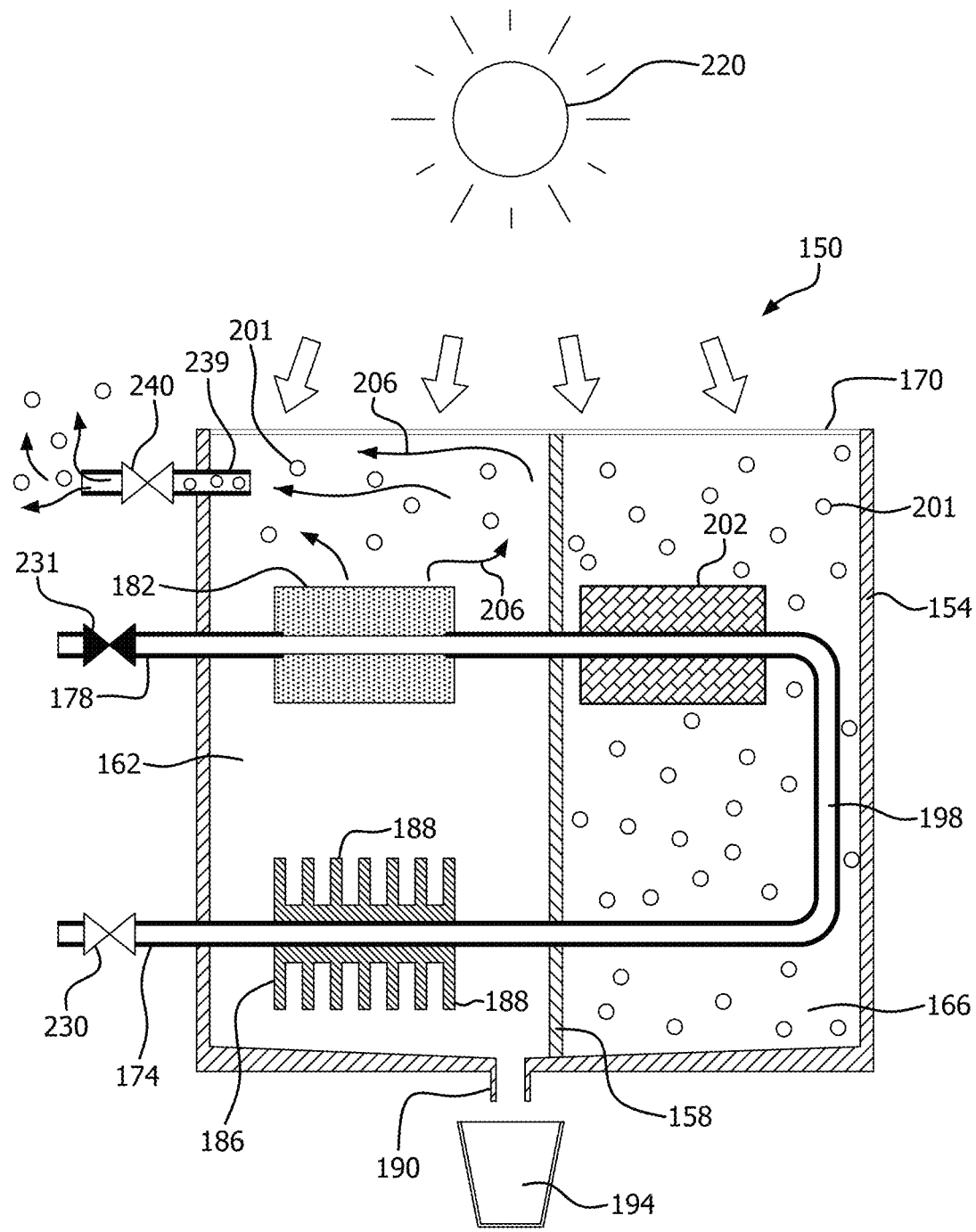
FIG. 11 is a schematic cross-sectional diagram illustration the solar distillation apparatus of FIG. 10, in a second mode of operation.

It is possible to utilize vapor from the distillation membrane 182 to drive air 201 from the distillation chamber 162 prior to operation of the device. As shown in FIGS. 10-11, in the initial condition the valve 240 is closed and flow through the gas exhaust conduit 239 is not possible. The valve 230 is opened to permit water to enter the system, however, the valve 231 can be closed to prevent treated water exhaust until evacuation of the air 201 and operation of the distillation apparatus 150 has been normalized. The water will flow to the distillation membrane 182 and generate water vapor 206 in the distillation chamber 162 (FIG. 11). The valve 240 can be opened and the generation of water vapor 206 will drive air from the distillation chamber 162. The valve 240 can then be closed and the valve 231 opened to begin normal operation of the solar distillation apparatus 150.

The invention has applications other than solar distillation. The invention can be used for other separation processes. A separation membrane according to the invention can have a graphitic foam and a surface coating of a hydrophobic composition on the surface and pores of the graphitic foam. The surface of the graphitic foam can thereby be rendered superhydrophobic. The dimensions and porosity of the separation membrane can be adjusted to the separation process for which the separation membrane will be used by the addition of micro/nano pores into surface cells of the membrane.

The graphitic foam is black which assists in absorption of solar light and heating of the membrane and thereby the transition of water to water vapor. It is also possible to apply a solar absorptive coating on the solar-facing side of the membrane to assist in solar absorption.

A method of solar distillation or separation includes the step of positioning the membrane of the invention such that the vapor side of the distillation membrane receives solar or another form of radiation. The term solar radiation as used herein can include natural sunlight or artificial light having a sufficient energy and wavelength to transmit thermal energy through the graphitic foam to contact the water or other liquid being separated. The solar distillation membrane comprises a porous graphitic foam and a surface coating of a hydrophobic composition on the surface and pores of the graphitic foam.

Feed water is supplied to the water/liquid side of the distillation membrane, which is the side with the micro/nanoparticles and hydrophobic coating. Water at the surface on the liquid side of the solar distillation membrane will be vaporized and the water vapor will pass through pores of the graphitic foam, and liquid water will be repelled by the superhydrophobic surface of the solar distillation membrane. The water vapor emerges from the pores at the vapor side of the membrane.

The water vapor can be condensed by any suitable process. In one embodiment, the water vapor is contacted with feed water to simultaneously heat the feed water while condensing the water vapor. Different heat exchange designs and constructions to accomplish this heat transfer are possible. The method of the invention can therefore include the step of supplying feed water to a condenser prior to the solar distillation membrane, and exchanging heat with the collected water vapor distilled through the solar distillation membrane, whereby the water vapor will be condensed and the feed water will be heated.

The method can also include the step of pre-heating the feed water prior to the distillation membrane. The pre-heating can be accomplished by any suitable method, and in one embodiment includes a pre-heater that is positioned to receive solar radiation and to transfer heat absorbed from the solar radiation to the liquid water prior to contact with the distillation membrane.

The solar distillation membrane can be provided at one location and the condensing step can be performed at another location defining a vapor space. The method can include the step of withdrawing air from the vapor space between the solar distillation membrane and the condensing location prior to starting condensing of the water vapor. The withdrawing of air can be by vacuum.

The withdrawing of air can also be accomplished by water vapor pressure. The condensing step is not started until the withdrawing of air step has been completed, and water vapor from the solar distillation membrane forces air from the vapor space. Hot water vapor is passed through the membrane and cold water through the condenser. If the gas valve on the chamber is opened, steam will drive out the air with it, and eventually there will be little air in the system. The gas valve is closed, and then the valve is opened to permit water to flow through the condenser at 25° C. This drops the vapor pressure of the water around the condenser to approximately 23.7 torr, creating a significant pressure gradient. The low pressure around the condenser will effectively reduce the pressure around the membrane, acting like a vacuum. In this case the vacuum pump is actually the condenser as it condenses the water from the vapor space. This reduced pressure around the membrane will cause the water to evaporate at a much increased rate from the water in the membrane, thus substantially increasing the through put of the fresh water.

Graphitic foams are carbon-based materials with high thermal conductivity, good porosity, and are light in weight. Graphite foam articles and methods for manufacturing graphite foams are described in U.S. Pat. No. 6,033,506 "PROCESS FOR MAKING CARBON FOAM"; U.S. Pat. No. 6,037,032 "PITCH-BASED CARBON FOAM HEAT SINK WITH PHASE CHANGE MATERIAL"; U.S. Pat. No. 6,261,485 "PITCH BASED CARBON FOAM AND COMPOSITES"; U.S. Pat. No. 6,287,375 "PITCH BASED FOAM WITH PARTICULATE"; U.S. Pat. No. 6,344,159 "METHOD FOR EXTRUDING PITCH BASED FOAM"; U.S. Pat. No. 6,387,343 "PITCH-BASED CARBON FOAM AND COMPOSITES"; U.S. Pat. No. 6,398,994 "METHOD OF CASTING PITCH BASED FOAM"; U.S. Pat. No. 6,399,149 "PITCH-BASED CARBON FOAM HEAT SINK WITH PHASE CHANGE MATERIAL"; U.S. Pat. No. 6,491,891 "GELCASTING POLYMERIC PRECURSORS FOR PRODUCING NET-SHAPED GRAPHITES"; U.S. Pat. No. 6,656,443 "PITCH BASED CARBON FOAM AND COMPOSITES"; U.S. Pat. No. 6,673,328 "PITCH BASED CARBON FOAM AND COMPOSITES AND USES THEREOF"; U.S. Pat. No. 6,780,505 "PITCH-BASED CARBON FOAM HEAT SINK WITH PHASE CHANGE MATERIAL"; U.S. Pat. No. 6,855,744 "GELCASTING POLYMERIC PRECURSORS FOR PRODUCING NET-SHAPED GRAPHITES"; U.S. Pat. No. 7,070,755 "PITCH-BASED CARBON FOAM AND COMPOSITES AND USE THEREOF"; U.S. Pat. No. 7,456,131 "INCREASED THERMAL CONDUCTIVITY MONOLITHIC ZEOLITE STRUCTURES"; and U.S. Pat. No. 7,670,682 "METHOD AND APPARATUS FOR PRODUCING A CARBON BASED FOAM ARTICLE HAVING A DESIRED THERMAL-CONDUCTIVITY GRADIENT", which are each herein incorporated by reference as if included at length. Graphite foam materials are commercially available from Poco Graphite, Inc., 300 Old Greenwood Road, Decatur, Tex. 76234, and Koppers, LLC, 436 Seventh Avenue, Pittsburgh, Pa. 15219-1800.

Figure 12:
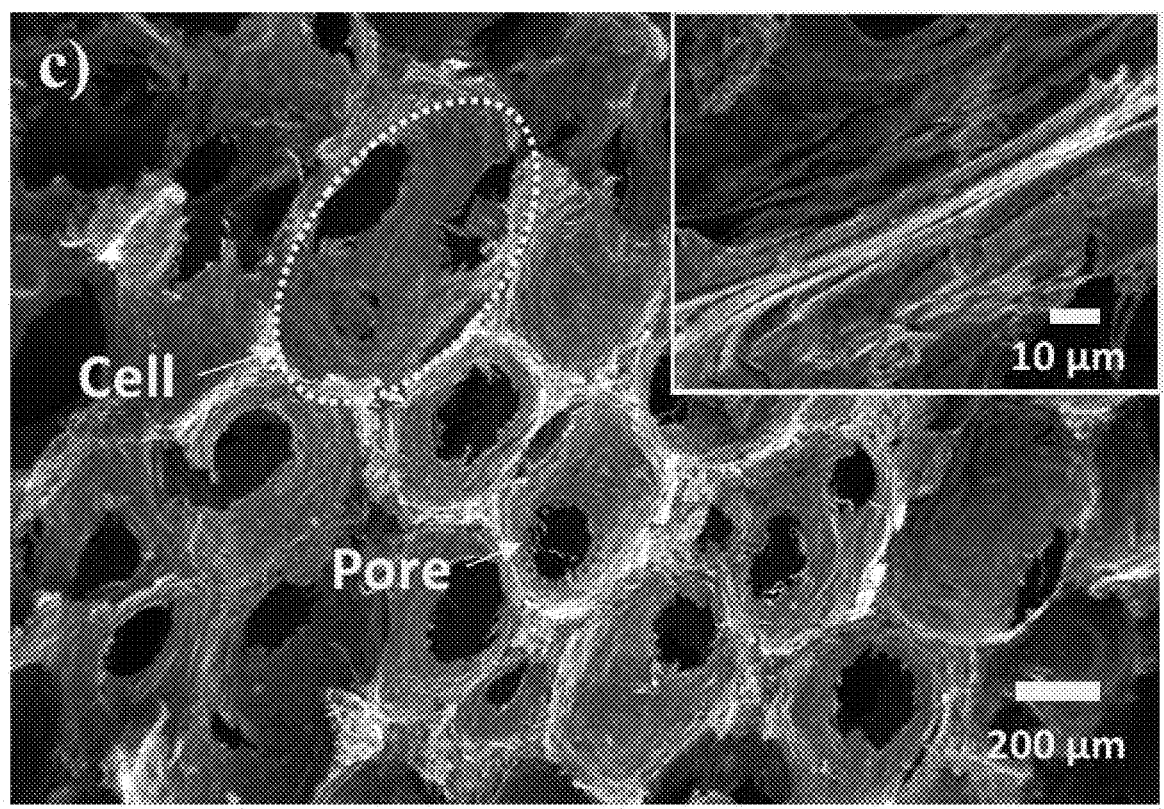
FIG. 12 is a scanning electron microscope (SEM) image of a graphitic foam coated with a hydrophobic composition.
Figure 13:
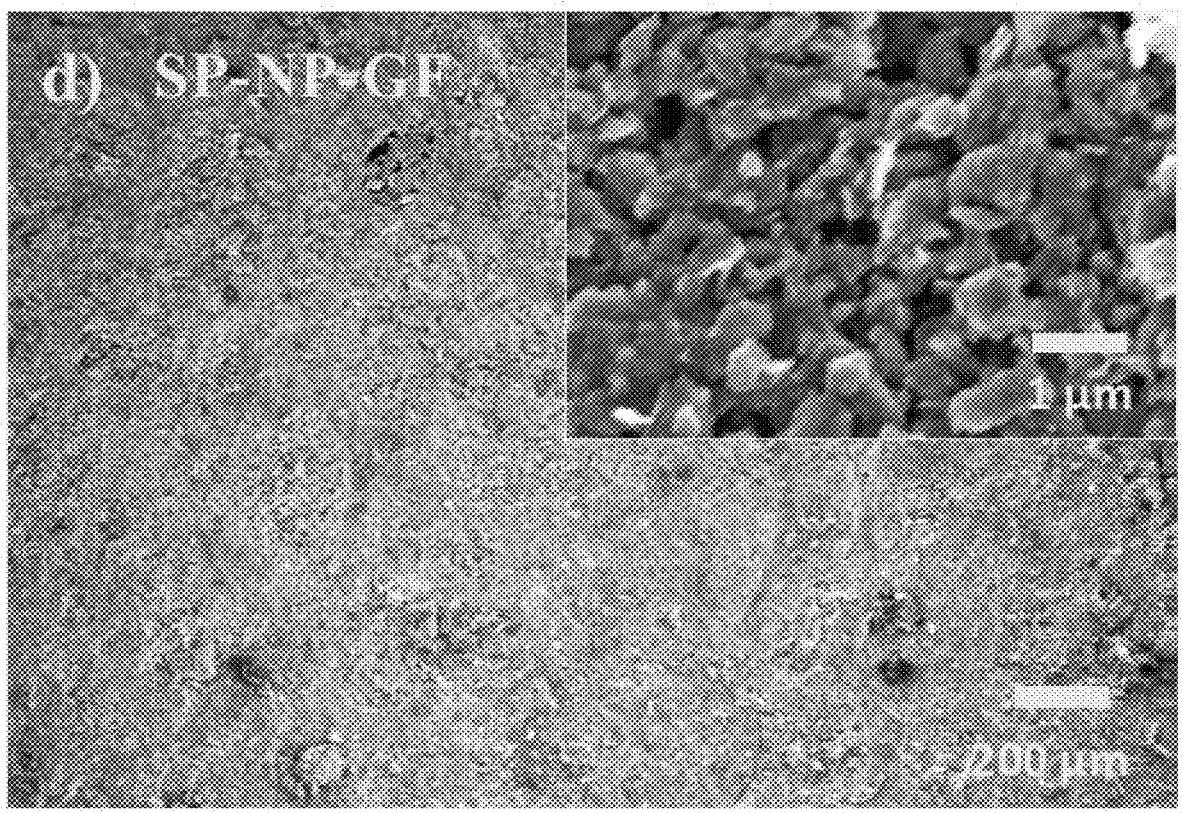
FIG. 13 is a SEM image of a graphitic foam with nanoparticles in the pores and coated with a hydrophobic composition.

An SEM image of a graphitic foam is shown in FIG. 12. An SEM image of the graphitic foam filled at the surface with nanoparticles and coated with a hydrophobic composition to render the surface superhydrophobic is shown in FIG. 13.

EXAMPLE

A black, porous and thermally conductive graphitic foam with ~200 um pore sizes and ~1000 um cell was prepared as a baseline porous support. The graphitic foam is a black 3D structural material in which the crystallized graphite ligaments formed in interconnected open cells with pores. The graphitic foam has a low average bulk density of 0.2-0.6 g cm$^{-3}$, and compression strength and modulus of ≈5 MPa and ≈410 MPa, respectively. It has a bulk thermal conductivity as high as >150 W m$^{-1}$ K$^{-1}$ with controllable pore and high porosity (≈80%). The pore size of the baseline support could be in the range of 10 um~2000 um.

An intermediate porous surface layer (~5 um pore size) was created in a graphitic foam with micro-carbon particles having a diameter of 10~20 μm. The micro-carbon particles were mixed with a diluted phenolic resin solution at a volumetric mix ratio of 6:4 for phenolic resin to ethanol, with a micro-carbon particle to the phenolic resin solution weight ratio of 2:1. The slurry solution was poured into a channel 4 mm in diameter which was machined by drilling and burnishing into a graphitic foam rod block. Then, the particle slurry was squeezed into the open cells inside channel by pushing a ball with a 4 mm diameter. The micro particle coated graphitic foam was dried at 80° C. overnight and then cured at 300° C. for 1 h. The ball mill coating process was repeated and followed again by drying at 80° C. and curing at 300° C. to reduce defects.

A hydrophilic membrane skin layer with ~500 nm pore size in ~10 um thickness was fabricated by ~500 nm graphite nanoparticle. The graphite nanoparticles were mixed with a diluted phenolic resin solution, phenolic resin:ethanol=6:4 volume ratio, with weight ratios of 2:1 for nanoparticle to resin solution. Then, the stock nanoparticle solution was diluted by ethanol to adjust to 5 wt % of nanoparticles for the coating solution. The end of one side of the graphitic foam tube was closed. Then, the nanoparticle solution was poured into the intermediate layer coated inside channel. The nanoparticle solution was used to fill the entire inside surface of the tube. After 1 min, the end of channel was opened to draw extra solution out. After drying for ~10 min, the inside dip coating process was repeated. Then, the micro/nano particle coated tube was dried at 80° C. overnight and cured at 300° C. for 1 h. The inside dip-coating can be repeated to reduce possible defects. The resulting membrane is hydrophilic.

The membrane is made superhydrophobic membrane by covalent bonding of low surface energy silane molecules such as perfluorosilane on the nanoparticle membrane surface. The entire hydrophilic membrane coated tube was immersed in a superhydrophobic coating solution (0.1 wt % of silane in hexane/or ethanol) in a chamber overnight or 1 h at 100° C. The membrane tube was rinsed with copious water and ethanol to remove unbound silane molecules. The resulting superhydrophobic membrane is used for membrane distillation for desalination, bio-oil separation and wastewater treatment.

The tubular solar distillation membrane provides a black porous graphitic foam outer shell which absorbs solar energy and the absorbed heat transfers to the salt or brackish water inside the tube producing fresh water vapor. The microporous structure in the skin layer of the membrane allows water vapor to permeate through the membrane and blocks the bulk salt liquid at the superhydrophobic surface of the membrane.

Figure 14:
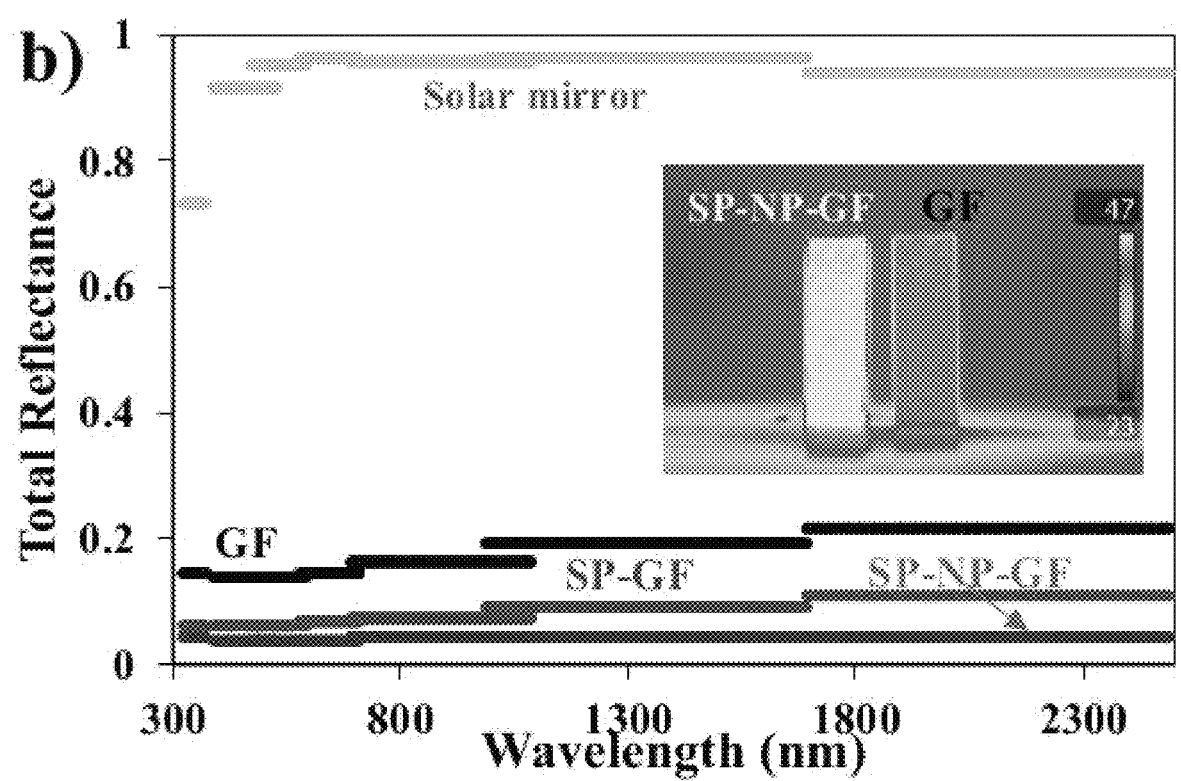
FIG. 14 is a plot of total reflectance vs. wavelength (nm).

In the pore-size controlled graphitic foam membrane with nanoparticles and a hydrophobic coating, with ≈500 nm of open pores, the membrane exhibited superhydrophobicity) (>150° originating from the rough surface of the nanoparticle layer. The intrinsic graphitic foam has a total reflectance of 0.155 (light absorption [A]=84.5%) over a wavelength range of 330-2500 nm (typical solar radiation). Coating the surface with fluorosilane molecules resulted in the surface of the foam becoming darker, reducing the total reflectance to 0.068 (A=93.2%). The self-assembled thin molecular coating changed the reflective index of the surface, increasing the solar absorption. The fluorosilane coating on the surface of carbon nanoparticle membrane further reduced the total reflectance to 0.036 (A=96.4%) since the molecular coating created a surface with nano-scale roughness and hence the light absorption was enhanced. The intrinsic nanoparticle membrane showed 0.052 total reflectance (A=94.8%). See FIG. 14. Separation performance was tested using a batch membrane vessel device including a membrane cup and a lid. The membrane vessel was fabricated by a similar method, as described above. The difference was that the intermediate layer was formed with 500 nm nanoparticles with a knife casting. The nanoparticle layer was also 500 nm nanoparticles, and hydrophobic coating procedures were the same to provide superhydrophobicity.

Figure 16:
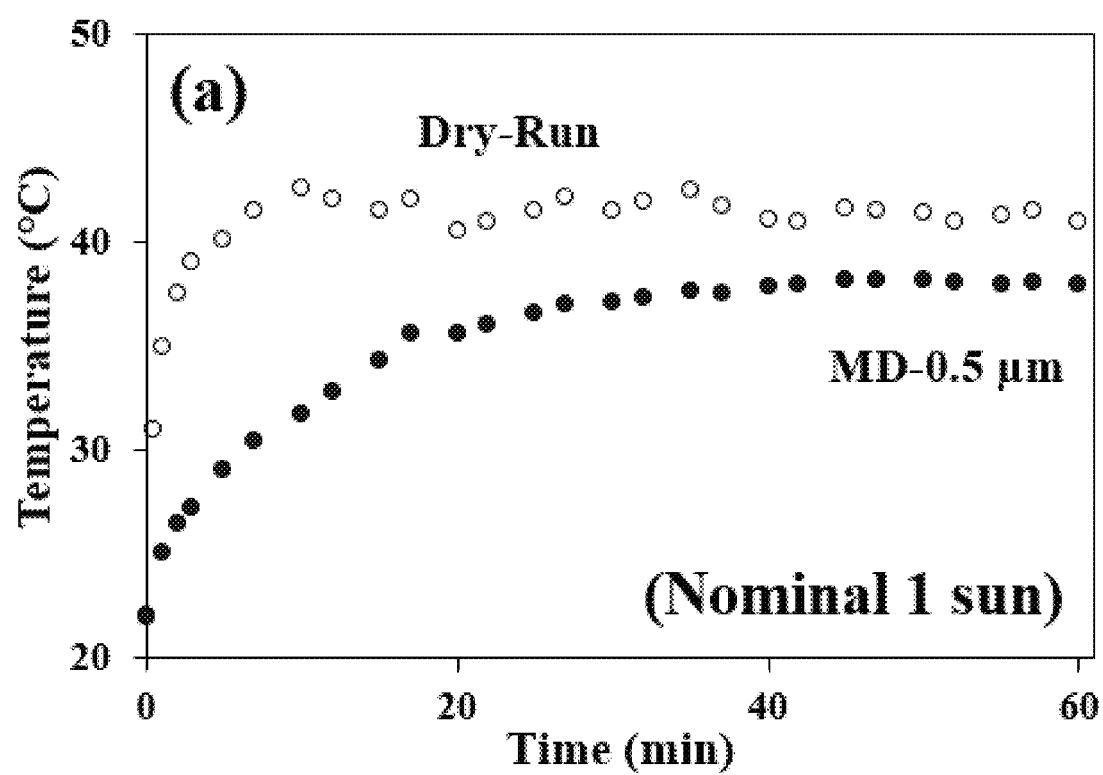
FIG. 16 is a plot of temperature (° C.) v. time (min) for the solar membrane distillation at nominal 1 sun (1 kWm$^{-2}$)
Figure 17:
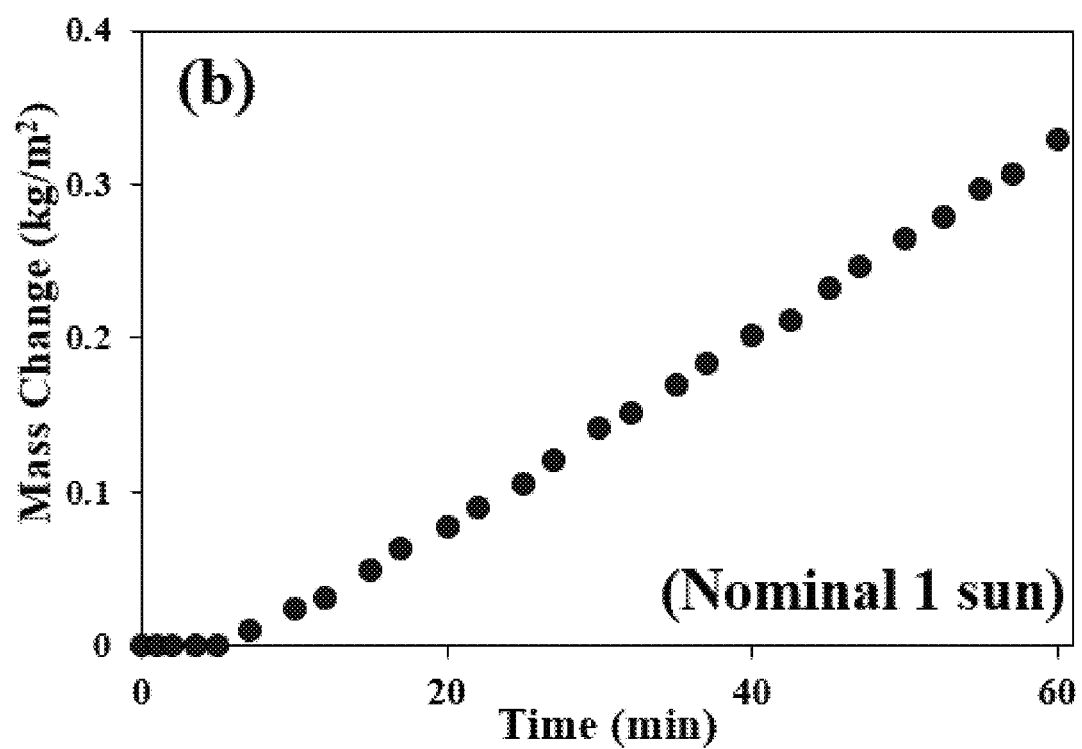
FIG. 17 is a plot of mass change (−kg/m$^2$) v. time (min) for the solar membrane distillation at nominal 1 sun (1 kWm$^{-2}$).

The temperature of the membrane distillation (MD) devices rise over time. All experiments were conducted at an ambient temperature of 21° C. The DR (dry-run) denotes experiment for the empty device under nominal 1 sun (FIG. 16). A simulated solar light with an intensity of 1 kW·m$^{-2}$ was directed onto the top surface of membrane distillation vessel. The device was heated to ~43° C. without salt water as a dry run (DR) under nominal 1 sun irradiation. The evaporation rate of simulated sea water (3.5 wt % salinity) in the membrane vessel device was measured. (FIG. 17). The water loss by evaporation under 1 sun light irradiation was 0.34 kg m$^{-2}$ h$^{-1}$ with an efficiency of 23.5%. The vapor generation efficiency could be enhanced by adopting different MD configurations using an additional driving force (e.g., vacuum) and a condensation system.

Figure 18:
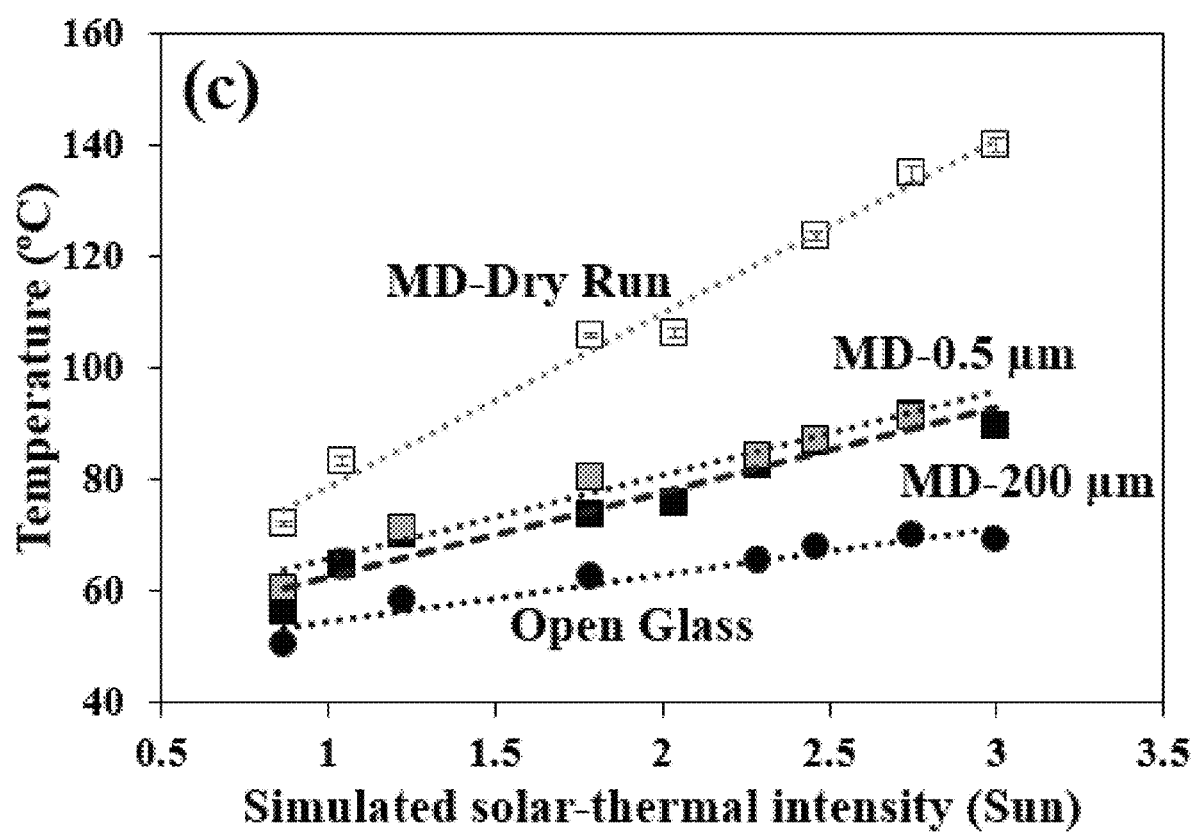
FIG. 18 is a plot of temperature (° C.) v. simulated solar-thermal intensity (Sun) for MD-Dry run, MD-0.5 μm, MD-200 μm, and open glass, illustrating solar membrane distillation performance as a function of the solar-thermal intensity.
Figure 19:
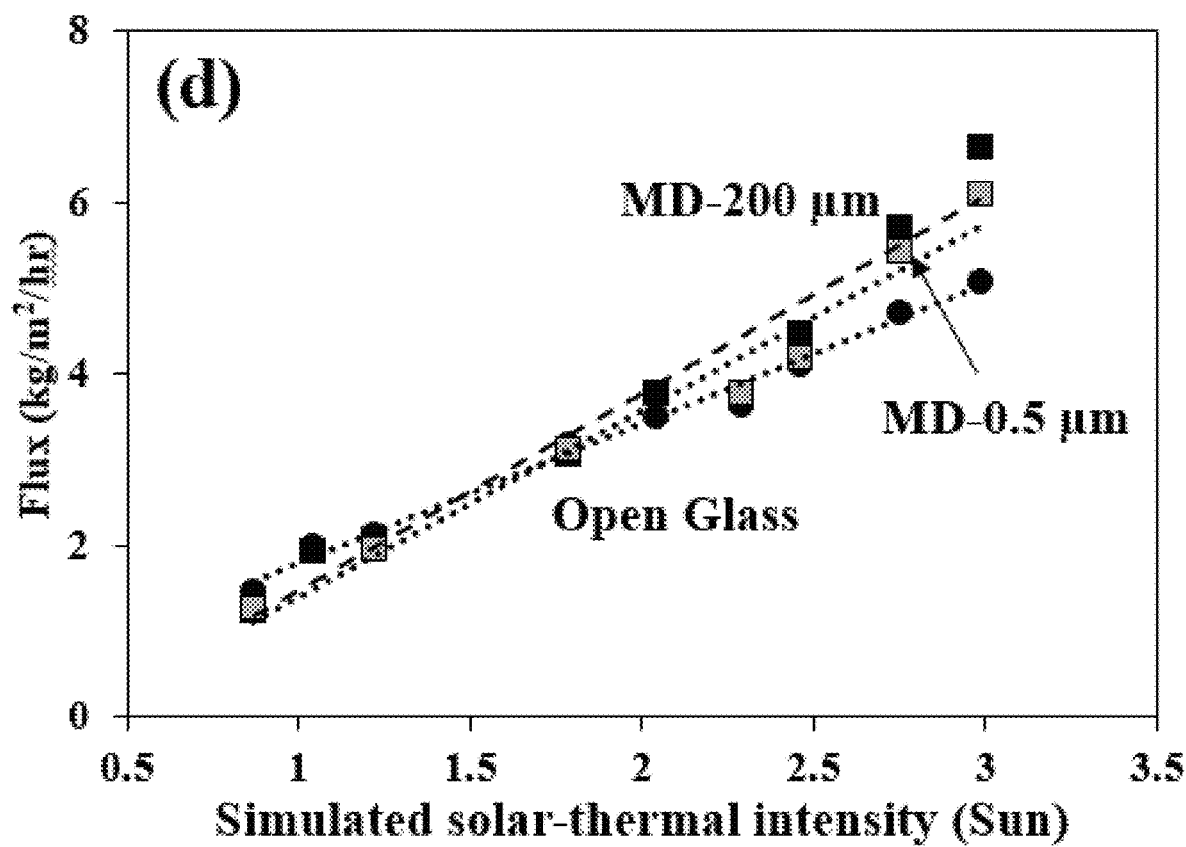
FIG. 19 is a plot of flux (kg/m$^2$/hr) v. simulated solar-thermal intensity (Sun).

The average temperature profiles for 30-60 min of MD devices compared with open bulk water in a glass vessel as a control test under different solar-thermal irradiations (FIG. 18). The MD-200 μm sample had no micro/nano particles, just the graphitic foam coated with the hydrophobic material. The permeate flux of MD devices under different solar-thermal illuminations is shown in FIG. 19. The dotted lines are linear regression fittings. Error bars are the standard deviations in the mean value (N=3). The error bars may not be seen because of the low values (<2%).

To represent ambient temperature condition in hot, arid areas, a solar-thermal simulator to mimic solar heat radiation using an incandescent heat lamp (2700 K lamp) was used. The concentrated solar intensity (e.g., 1-3 sun intensity) was calibrated while maintaining the distance between the midpoint of the outer surface of the lamp and the vessel surface. With solar-thermal simulation, the ambient temperature 5 cm above the graphitic foam chamber was ≈37.2° C. at 0.87 sun. Under concentrated solar-thermal irradiation at 0.87 sun, the membrane vessel was heated up to ~60° C. and MD vapor permeation flux increased significantly to 1.25 kg m$^{-2}$ h$^{-1}$, compared to the nominal one sun intensity because more IR light was applied to the device surfaces (FIG. 18 and FIG. 19). The high permeation flux of MD has been attributed to its higher thermal driving force, Δ15.8° C. FIG. 18 and FIG. 19 show the temperature and permeate flux profiles as a function of simulated solar-thermal intensity. The temperature of the device chamber and the permeate flux increased as the solar-thermal intensity increased as a result of the increased light and heat absorption. At an intensity of 3 sun, the MD-200 µm system showed higher vapor flux than the control glass chamber. The MD permeate performance of 6.6 kg m$^{-2}$h$^{-1}$ at 3 sun intensity is comparable to that of the polymer air gap MD membrane (e.g., 1-5 kg m$^{-2}$h$^{-1}$ for seawater desalination).

Figure 15:
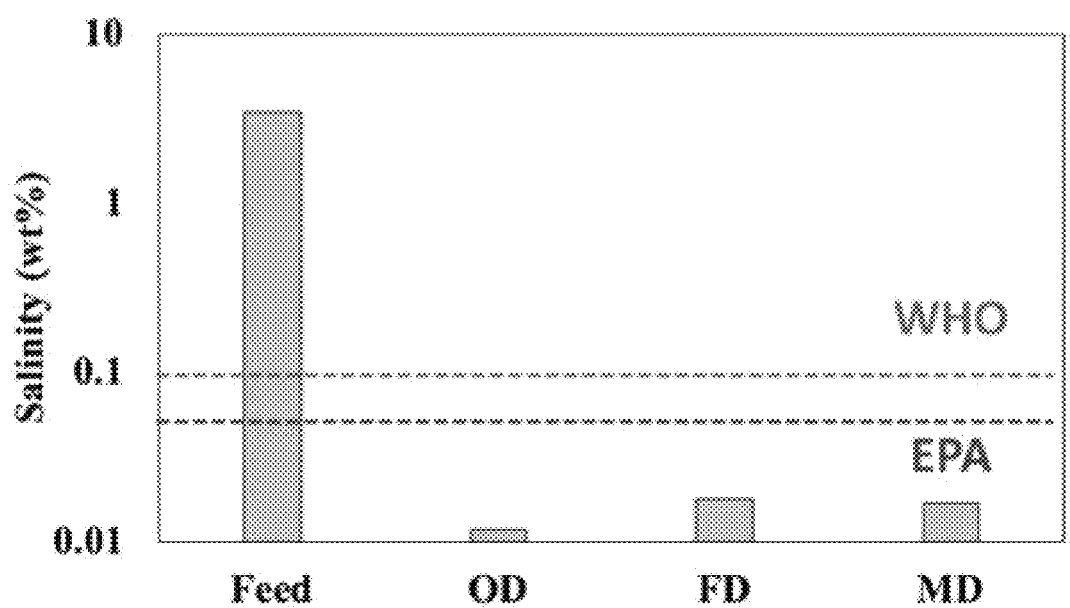
FIG. 15 is a plot of characteristics of desalination performance based on the different distillation module systems: open-vessel distillation (OD), flow channel distillation (FD), and membrane distillation (MD).

The salinity of the vapor permeating from the salt water in the MD systems was measured by electrical conductivity. A transparent glass chamber was capped on the SP-NP-GF devices, and the permeated vapor was observed to condense inside the beaker during irradiation. The concentrations of Na$^+$ ions collected from the condensation were determined to be 0.01-0.017 wt % with 99.5% salt rejection. FIG. 15 shows characteristics of desalination performance based on the different distillation module systems: open-vessel distillation (OD), flow channel distillation (FD), and membrane distillation (MD). The salinities of the condensates were below the drinking water standards determined by the World Health Organization (0.1 wt %) and the US environmental Protection Agency (0.05 wt %).

In the solar distillation heat exchanger (i.e., open vessel distillation), as shown FIG. 8, the black graphitic foam beneath a salt water layer absorbs solar energy to heat the salt water to produce fresh water vapor and the superhydrophobic surface of the porous micro/nano particle layer traps the liquid feed on the surface. For the dry run (without salt-water), the OD vessel with an SP-NP-GF layer was heated to ≈47° C. in 10 min; for OD desalination, it was heated to ≈37.9° C. in 30 min, resulting in an effective permeate flux of 1.02 kg m$^{-2}$ h$^{-1}$ (calculated from 0.5 to 1 h) with a vapor-generation efficiency of 63.9%. Under concentrated solar-thermal irradiation at 0.87 sun, the OD vapor permeation flux increased significantly to 2.26 kg m$^{-2}$ h$^{-1}$, respectively, because more IR light was applied to the device surfaces. The efficient solar absorption, controllable heat management, and porous nature of this structure enables estimated direct-solar desalination performance of ≈8.8 kg m$^{-2}$ h$^{-1}$ of permeate flux at 3 sun and ≈99.5% salt rejection under simulated concentrated solar-thermal irradiation. Results for both types of vessels are shown in Table 1.

those skilled in the art are considered to be within the scope of this invention as broadly defined in the appended claims. In addition, it is to be understood that the phraseology and terminology employed herein are for the purpose of description and should not be regarded as limiting.

We claim:

1. A solar membrane distillation apparatus, comprising:
    a housing comprising a light transmitting wall;
    a solar distillation membrane positioned in the housing to receive solar radiation transmitted through the light transmitting wall, the solar distillation membrane comprising a porous graphitic foam and a coating of a hydrophobic composition on the surface and pores of the graphitic foam;
    a water chamber within the housing for retaining water adjacent to the solar distillation membrane;
    a vapor chamber for collecting water vapor distilling through the solar distillation membrane;
    a condenser for condensing distilled water vapor from the vapor chamber into liquid water.

2. The solar membrane distillation apparatus of claim 1, wherein the membrane surface is superhydrophobic.

3. The solar membrane distillation apparatus of claim 1, wherein the solar distillation membrane is tubular and has an open interior, the open interior of the tubular distillation membrane forming the water chamber.

4. The solar membrane distillation apparatus of claim 3, wherein the condenser comprises a feed water heat exchange conduit for receiving feed water and exchanging heat with the water vapor to condense the water vapor to liquid water.

5. The solar membrane distillation apparatus of claim 4, further comprising a pre-heating chamber for pre-heating feed water prior to contacting the feed water with the distillation membrane.

6. The solar membrane distillation apparatus of claim 5, wherein the pre-heating chamber comprises a conduit with an outer layer of graphitic foam.

7. The solar membrane distillation apparatus of claim 1, wherein the solar distillation membrane is in the form of a vessel, the vessel forming a liquid chamber.

TABLE 1

Summary of characteristics of membrane performance

|  | Membrane Pore size (nm) | Membrane Thickness (um) | Solar absorption | Nominal Solar conversion efficiency | Nominal Flux (kgm$^{-2}$h$^{-1}$) | Flux by solar-thermal irradiation (kgm$^{-2}$h$^{-1}$) | | | Salt rejection (%) |
| --- | --- | --- | --- | --- | --- | --- | --- | --- | --- |
|  |  |  |  |  |  | 1 | 2 | 3 |  |
| Membrane vessel | 500 | 10 | 96.4% | 24% | 0.34 | 1.9 | 3.8 | 6.7 | >99.5 |
| Open Vessel | — | — | — | 64% | 1.02 | 3 | 5.8 | 8.2 | >99.5 |

The invention as shown in the drawings and described in detail herein discloses arrangements of elements of particular construction and configuration for illustrating preferred embodiments of structure and method of operation of the present invention. It is to be understood however, that elements of different construction and configuration and other arrangements thereof, and methods of operation other than those illustrated and described may be employed in accordance with the spirit of the invention, and such changes, alterations and modifications as would occur to 8. The solar membrane distillation apparatus of claim 1, wherein micro/nano particles are adhered within the pores of the graphitic foam.

9. The solar membrane distillation apparatus of claim 8, wherein the micro/nano particles comprise at least one selected from the group consisting of graphite and ceramic oxide.

10. The solar membrane of claim 8, wherein the micro/nano particles are from 0.5 µm to 2 µm in diameter.

11. The solar membrane distillation apparatus of claim 1, wherein the pore size of the solar distillation membrane at the surface of the solar distillation membrane is from 0.5 µm to 2 µm.

12. The solar membrane distillation apparatus of claim 1, wherein the bulk porosity of the graphitic foam is from 50 to 95%, and the porosity of the pores of the graphitic foam at the surface of the distillation membrane is from 40 to 80%.

13. The solar membrane distillation apparatus of claim 1, wherein the hydrophobic composition is at least one selected from the group consisting of fluorosilanes, linear alkyl-silanes, branched alkyl-silanes, aromatic-silanes, fluorinated alkyl-silanes, dialkyl-silanes, carbon nanotubes, and carbon soot.

14. The solar distillation membrane of claim 13, wherein the fluorosilane comprises the decomposition reaction product of heptadecafluoro-1,1,2,2-tetrahydrodecyl) trichlorosilane.

15. The solar membrane distillation apparatus of claim 1, wherein the hydrophobic coating is from 1 to 2 nm thick.

16. A separation membrane, comprising a graphitic foam and a surface coating of a hydrophobic composition on the surface and pores of the graphitic foam, the surface of the graphitic foam being superhydrophobic, wherein the hydrophobic composition is at least one selected from the group consisting of fluorosilanes, linear alkyl-silanes, branched alkyl-silanes, aromatic-silanes, fluorinated alkyl-silanes, dialkyl-silanes, carbon nanotubes, and carbon soot, and wherein the fluorosilane comprises the decomposition reaction product of heptadecafluoro-1,1,2,2-tetrahydrodecyl) trichlorosilane.

17. A method of solar distillation, comprising the steps of:
providing a solar distillation membrane positioned to receive solar radiation, the solar distillation membrane comprising a porous graphitic foam and a surface coating of a hydrophobic composition on the surface and pores of the graphitic foam;
contacting the solar distillation membrane with solar radiation;
supplying feed water to the solar distillation membrane, whereby water at the surface of the solar distillation membrane will be vaporized and the water vapor will pass through pores of the graphitic foam, and liquid water will be repelled by the hydrophobic surface of the solar distillation membrane;
collecting the water vapor; and,
condensing the water vapor into liquid water.

18. The method of claim 17, further comprising the step of supplying feed water to a condenser prior to the solar distillation membrane, and exchanging heat with the collected water vapor distilled through the solar distillation membrane, whereby the water vapor will be condensed and the feed water will be heated.

19. The method of claim 17, further comprising the step of pre-heating the feed water prior to contacting the feed water with the solar distillation membrane.

20. The method of claim 17, wherein the solar distillation membrane is provided at one location and the condensing step is performed at another location defining a vapor space, and further comprising the step of withdrawing air from the vapor space between the solar distillation membrane and the condensing location prior to starting condensing of the water vapor.

21. The method of claim 20, wherein the withdrawing of air is by vacuum.

22. The method of claim 20, wherein the withdrawing of air is by water vapor pressure.

23. The method of claim 22, wherein the condensing step is not started until the withdrawing of air step has been completed, and water vapor from the solar distillation membrane forces air from the vapor space.

* * * * *